United States Patent
Maskrot et al.

(10) Patent No.: US 12,084,749 B2
(45) Date of Patent: Sep. 10, 2024

(54) PROCESS FOR THE MANUFACTURE OF AN OPTIMISED STEEL MATERIAL

(71) Applicant: COMMISSARIAT A L'ENERGIE ATOMIQUE ET AUX ENERGIES ALTERNATIVES, Paris (FR)

(72) Inventors: Hicham Maskrot, Montlhery (FR); Aziz Chniouel, Cavaillon (FR); Fernando Lomello, Gif-sur-Yvette (FR); Pierre-François Giroux, Antony (FR); Pascal Aubry, Paris (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 79 days.

(21) Appl. No.: 17/091,540

(22) Filed: Nov. 6, 2020

(65) Prior Publication Data
US 2021/0138543 A1 May 13, 2021

(30) Foreign Application Priority Data
Nov. 7, 2019 (FR) .................... 19 12533

(51) Int. Cl.
*C22C 33/02* (2006.01)
*B22F 1/054* (2022.01)
(Continued)

(52) U.S. Cl.
CPC .......... *C22C 33/0285* (2013.01); *B22F 1/054* (2022.01); *B22F 10/00* (2021.01);
(Continued)

(58) Field of Classification Search
CPC ...... B22F 10/00; B22F 1/054; B22F 2301/35; B22F 2304/054; B22F 1/0007; B22F 3/15;
(Continued)

(56) References Cited

U.S. PATENT DOCUMENTS 5,908,486 A 6/1999 Flinn et al.
2017/0021420 A1* 1/2017 Buller ..................... C04B 35/64
(Continued)

FOREIGN PATENT DOCUMENTS

FR 2 932 705 A1 12/2009
JP 2019-60006 A 4/2019
JP 2019060006 A * 4/2019

OTHER PUBLICATIONS

JP-2019060006-A: Espacenet English machine translation (Year: 2019).*

(Continued)

*Primary Examiner* — Adil A. Siddiqui
(74) *Attorney, Agent, or Firm* — Oblon, McClelland, Maier & Neustadt, L.L.P.

(57) ABSTRACT

Process for the manufacture of a steel material, wherein the grains of which it is composed comprise a matrix into which precipitates are incorporated, the precipitates comprising at least one metallic element selected from a metallic element M, a metallic element M', a metallic element M" or mixtures thereof; the microstructure of the steel being such that the grains are equiaxial and the average size of the grains being such that the average of their largest dimension "Dmax" and/or the average of their smallest dimension "Dmin" is in the range 10 μm to 50 μm.

The steel material has optimised, stable and isotropic mechanical properties, in particular so that the steel material is more resistant to mechanical and/or thermal stresses.

30 Claims, 12 Drawing Sheets

| POWDER | % BY WEIGHT | | | | | | | | | | | |
|---|---|---|---|---|---|---|---|---|---|---|---|---|
| | Cr | Ni | Mn | Mo | Si | Fe | P | S | Cu | C | N | Co | O |
| ASTM A666 | 16-18 | 10-14 | <2 | 2-3 | <1 | Balance | <0.045 | <0.03 | <0.75 | <0.03 | | <0.1 | <0.1 |
| RCC-MRx | 16.50-18.50 | 10-13 | <2 | 2-2.50 | <1 | Balance | <0.030 | <0.05 | <1 | <0.03 | <0.11 | | |
| Powder of the invention | 16-18.50 | 10-14 | <2 | 2-3 | <1 | Balance | <0.045 | <0.05 | <1 | <0.03 | <0.11 | <0.1 | <0.1 |

(51) Int. Cl.
   *B22F 10/00* (2021.01)
   *B33Y 10/00* (2015.01)
   *B33Y 70/00* (2020.01)
   *B33Y 80/00* (2015.01)

(52) U.S. Cl.
   CPC ..... *B22F 2301/35* (2013.01); *B22F 2304/054* (2013.01); *B33Y 10/00* (2014.12); *B33Y 70/00* (2014.12); *B33Y 80/00* (2014.12)

(58) Field of Classification Search
   CPC . B22F 2009/0824; B33Y 10/00; B33Y 70/00; B33Y 80/00; C21D 2211/001; C21D 2211/004; C21D 2241/02; Y02P 10/25; C22C 38/002; C22C 38/004; C22C 38/02; C22C 38/04; C22C 38/40; C22C 38/44; C22C 38/58; C22C 33/0285
   See application file for complete search history.

(56) References Cited

U.S. PATENT DOCUMENTS

2018/0010221 A1* 1/2018 Aswathanarayanaswamy ............ B23K 26/342
2019/0048450 A1* 2/2019 Sakamoto ................ C22C 1/02

OTHER PUBLICATIONS

McHone Industries, "304 Vs. 304L Stainless Steel: Tale of the Tape", webpage, Oct. 17, 2017, pp. 1-4 (Year: 2017).*

French Preliminary Search Report issued Oct. 14, 2020 in French Application 19 12534 filed on Nov. 7, 2019 (with English Translation of Categories of Cited Documents & Written Opinion), citing documents AA & AW-AZ therein, 15 pages.

French Preliminary Search Report issued Oct. 14, 2020 in French Application 19 12533 filed on Nov. 7, 2019 (with English Translation of Categories of Cited Documents & Written Opinion), citing documents AA & AW-AZ therein, 15 pages.

French Preliminary Search Report issued Oct. 14, 2020 in French Application 19 12536 filed on Nov. 7, 2019 (with English Translation of Categories of Cited Documents & Written Opinion), citing documents AA & AW-AZ therein, 15 pages.

French Preliminary Search Report issued Oct. 6, 2020 in French Application 19 12535 filed on Nov. 7, 2019 (with English Translation of Categories of Cited Documents), citing documents AW-AZ therein, 4 pages.

Salman et al., "Effect of heat treatment on microstructure and mechanical properties of 316L steel synthesized by selective laser melting", Materials Science & Engineering A 748, 2019, pp. 205-212.

Lindstedt et al., "Microstructure and mechanical behaviour of single pressed and vacuum sintered gas and water atomised 316L stainless steel powders", Powder Metallurgy, vol. 41, No. 4, 1998, pp. 261-268.

Kong et al., "Mechanical properties and corrosion behavior of selective laser melted 316L stainless steel after different heat treatment processes", Journal of Materials Science & Technology 35, 2019, pp. 1499-1507.

Yan et al., "Characterization of nano-scale oxides in austenitic stainless steel processed by powder bed fusion", Scripta Materialia 155, 2018, pp. 104-108.

Laverne et al., "Fabrication additive-Principes généraux", [Additive manufacturing—General principles], Techniques de l'ingénieur, Fasicule [Paper], BM7017 V2, Feb. 2016, 20 pages (with English Abstract).

Fayazfar et al., "A critical review of powder-based additive manufacturing of ferrous alloys: Process parameters, microstructure and mechanical properties", Materials & Design, vol. 144, 2018, pp. 98-128.

Debroy et al., "Additive manufacturing of metallic components—Process, structure and properties", Progress in Materials Science, vol. 92, 2018, pp. 112-224.

Ministère de l'économie et des finances, République Française [French Ministry of Economic and Financial Affairs], "Prospective—futur de la fabrication additive—rapport final" [Prospective—the future of additive manufacturing—final report], Jan. 2017 edition, ISBN: 978-2-11-151552-9; in particular Appendix 2 (pp. 205 to 220), especially when it describes additive manufacturing processes using a metallic powder (Appendix 2, Les procédés de fabrication [Manufacturing processes], paragraphs 3, 4 and 5), 250 pages.

Wikipedia, "Intercept method", https://en.wikipedia.org/wiki/Intercept_method, Sep. 10, 2020, 6 pages.

ASTM International , Designation: E112-10, "Standard Test Methods for Determining Average Grain Size", fushunspecialsteel.com/wp-content/uploads/2015/09/ASTM-E112-2010-Standard-Test-Methods-for-Determining-Average-Grain-Size.pdf, 2010, 26 pages.

Dairon, "Développement d'une nouvelle technique d'élaboration de mousses d'acier par fonderie et caractérisation mécanique" [Development of a novel technique for manufacturing steel foams by smelting and mechanical characterization] (in particular pp. 109 to 112), available from the following address: https://tel.archives-ouvertes.fr/tel- 00694478/document2008, 241 pages (with English Abstract).

Office Action issued Nov. 22, 2021 in corresponding Japanese Patent Application No. 2020-185829 (with English Translation), citing document AO therein, 16 pages.

* cited by examiner

| POWDER | % BY WEIGHT | | | | | | | | | | | | |
|---|---|---|---|---|---|---|---|---|---|---|---|---|---|
| | Cr | Ni | Mn | Mo | Si | Fe | P | S | Cu | C | N | Co | O |
| ASTM A666 | 16-18 | 10-14 | <2 | 2-3 | <1 | Balance | <0.045 | <0.03 | <0.75 | <0.03 | | <0.1 | <0.1 |
| RCC-MRx | 16.50-18.50 | 10-13 | <2 | 2-2.50 | <1 | Balance | <0.030 | <0.05 | <1 | <0.03 | <0.11 | | |
| Powder of the invention | 16-18.50 | 10-14 | <2 | 2-3 | <1 | Balance | <0.045 | <0.05 | <1 | <0.03 | <0.11 | <0.1 | <0.1 |

Fig. 1

| POWDER | MATRIX | PRECIPITATES | |
|---|---|---|---|
| Element | % by wt, norm. | % by wt, norm. | % Atom. |
| C | 170 ppm | 2.04541274 | 8.05160448 |
| O | 284 ppm | 3.3833007 | 9.9981016 |
| Al | | 1.31230554 | 2.29958185 |
| Si | 0.43 | 0.96591155 | 1.62605729 |
| Ti | | 0.54142803 | 0.53464713 |
| Cr | 17.26 | 16.1583829 | 14.6929366 |
| Mn | 0.51 | 1.94358712 | 1.67267595 |
| Fe | The remainder is iron | 61.7940328 | 52.3151331 |
| Ni | 12.42 | 9.48815722 | 7.64155412 |
| Mo | 2.5 | 2.36948133 | 1.16770791 |
| N | 86 ppm | | |
| P | 44 ppm | | |
| S | 95 ppm | | |
| Cu | 100 ppm | | |
| TOTAL | 100 | 100 | 100 |

Fig. 2

| MATERIAL | % BY WEIGHT | | | | |
|---|---|---|---|---|---|
| Chemical element | Matrix | Oxide precipitate | Carbide | precipitate | Oxycarbide precipitate |
| C | | | 75.83 | 78.58 | 24.62 |
| O | | 41.62 | | | 7.03 |
| Al | | 1.94 | | | 0.39 |
| Si | 0.1 | 14.91 | | 0.78 | 3.91 |
| S | | 0.56 | | | |
| Ti | | 1.96 | | | 2.06 |
| Cr | 18.33 | 12.34 | 5.07 | 5.49 | 23.06 |
| Mn | 0.55 | 5.32 | 1.2 | 13.75 | 16.9 |
| Fe | 69.68 | 18.72 | 15.19 | 1.41 | 19.28 |
| Ni | 10.9 | 2.63 | 2.71 | | 2.76 |
| Mo | 0.44 | | | | |
| Total | 100 | 100 | 100 | 100 | 100 |

Fig. 3

| CHEMICAL ELEMENT | % BY WEIGHT ||||| PPM BY WEIGHT ||||||
|---|---|---|---|---|---|---|---|---|---|---|---|
| | Cr | Ni | Mn | Mo | Si | O | N | C | P | S | Cu |
| Trumpf powder | 17.55 | 11.75 | 1.15 | 2 | 0.45 | 231 | 877 | 170 | 7 | 65 | 250 |

Fig. 13

| CHEMICAL ELEMENT | % BY WEIGHT |||
|---|---|---|---|
| | Matrix | Oxide | Oxide |
| O | | 51.12 | 31.11 |
| Al | | 1.49 | 1.34 |
| Si | 1.79 | 20.81 | 11.42 |
| S | | 0.1 | 0.38 |
| Cr | 18.34 | 8.19 | 13.44 |
| Mn | 1.55 | 16.32 | 7.08 |
| Fe | 61.63 | 1.73 | 27.43 |
| Ni | 11.68 | 0.24 | 5.9 |
| Mo | 5.02 | 1.91 | 1.91 |
| Total | 100 | 100 | 100 |

Fig. 14

| CHEMICAL ELEMENT | % BY WEIGHT | | | | | PPM BY WEIGHT | | | | | |
|---|---|---|---|---|---|---|---|---|---|---|---|
| | Cr | Ni | Mn | Mo | Si | O | N | C | P | S | Cu |
| Trumpf steel | 16.85 | 12.35 | 1.05 | 1.98 | 0.61 | 344 | 1228 | 150 | 80 | 40 | 450 |

| Conditions | $R_m$ (MPa) | | $R_{p0.2}$ (MPa) | | $A_{break}$ (%) | |
|---|---|---|---|---|---|---|
| | //Z | ⊥Z | //Z | ⊥Z | //Z | ⊥Z |
| 316L steel, Trumpf, as built | | | | | | |
| Trumpf | 584 ± 3 | 717 ± 2 | 520 ± 7 | 588 ± 9 | 77 ± 6 | 55 ± 2 |
| % anisotropy | 22% | | 13% | | 40% | |
| 316L steel, Trumpf, after HIP treatment | | | | | | |
| Trumpf | 570 ± 2 | 611 ± 3 | 270 ± 2 | 260 ± 2 | 80 ± 4 | 74 ± 2 |
| % anisotropy | 7% | | 4% | | 8% | |
| 316L steel, Praxair, as built | | | | | | |
| Praxair | 620 ± 3 | 670 ± 1 | 429 ± 6 | 486 ± 2 | 49 ± 5 | 62 ± 2 |
| % anisotropy | 8% | | 13% | | 27% | |
| 316L steel, Praxair, after HIP treatment | | | | | | |
| Praxair | 608 ± 8 | 642 ± 1 | 333 ± 4 | 337 ± 7 | 78 ± 2 | 74 ± 1 |
| % anisotropy | 5% | | 1% | | 5% | |

Fig. 20

PROCESS FOR THE MANUFACTURE OF AN OPTIMISED STEEL MATERIAL

TECHNICAL FIELD

The present invention pertains to the field of iron-based alloys, in particular low carbon steels.

More particularly, the invention relates to an optimised steel material, the process for the manufacture or treatment of the steel material, as well as to a part manufactured from the steel material and to the process for the manufacture of that part.

PRIOR ART

The standard NF E 67-001 defines additive manufacturing as "the set of processes enabling a physical object to be manufactured layer by layer by the addition of material, starting from a digital object".

Additive manufacture is a technology which can be used to build parts by adding material, in contrast to "conventional" processes (machining, forging, rolling, etc) which are characterized by the removal of material (subtractive processes). It offers the possibility of designing parts with complex geometries which are impossible to produce with conventional processes. Because of the possibilities that they offer from a technical and economical point of view, additive manufacturing processes have been booming since the 1980s. These innovative processes for shaping materials are used in various industrial sectors, in particular in the medical, aeronautical and space fields.

The principle of additive manufacture (also known as "3D printing") is thus that of a generative manufacturing process, which is basically two steps which are reiterated until the finished solid product is obtained:
1. Generating a layer of material with a fixed contour and thickness. The material is deposited only where it is required;
2. Producing a new layer by adding material above the preceding layer. The manufacture can be summarised as being a "stepwise" manufacture.

Among the many additive manufacturing processes, the selective laser melting (SLM) process is one of the most widely known and used for building metal parts.

A steel produced by an additive manufacturing process such as by selective laser melting, for example, has an austenitic face centred cubic structure.

Its microstructure is heterogeneous, but it is also hierarchical, depending on whether it is considered on a macro, micrometric or nanometric scale.

Thus, a microstructural anisotropy appears which is a function of the plane of observation: thus, two planes of observation (in the build direction (//Z) and along the XY axis perpendicular to the build direction ($\perp$Z)) are necessary in order to describe the microstructure of the steel produced by selective laser melting, as will be illustrated below.

Thus, this microstructure differs from that obtained by conventional manufacturing processes such as forging processes, which result in a forged steel.

Furthermore, when subjected to a high temperature, starting from 900° C., substantial microstructural modifications to the steel obtained by additive manufacture occur. From this temperature, the cellular sub-structure is such that the cells of which it is composed grow larger until they disappear completely when the temperature is greater than 950/1000° C. The grain size per se increases substantially from 1100° C.

Furthermore, a heat treatment (such as hot isostatic pressing, for example (HIP)) causes significant microstructural modifications to the steel produced by selective laser melting. By way of example, the grains of the 316 L steels obtained are systematically equiaxial after a HIP treatment at 1150° C. for 4 hours under a pressure of 1000 bar or 1150° C. for 3 hours at a pressure of 1500 bar; the equiaxial grains have average sizes in the range 70 μm to 150 μm.

The microstructural anisotropy of a prior art steel material obtained by an additive manufacturing process is detrimental to the good behaviour of that material when it is subjected to thermal and/or mechanical stresses. This anisotropy may be partially reduced after a heat treatment has been applied to the steel material, but this nevertheless suffers from the disadvantage that it causes an increase in the grain size of the steel material, which in turn is detrimental to its resistance to thermal and/or mechanical stresses.

DISCLOSURE OF THE INVENTION

Thus, one of the aims of the invention is to prevent or mitigate one or more of the disadvantages described above, in particular by providing a steel powder which is capable of forming a steel material with optimised, stable and isotropic mechanical properties, in particular so that the steel material is more resistant to mechanical and/or thermal stresses.

Thus, the present invention concerns a process for the manufacture of a steel material, in which a steel powder undergoes a consolidation process in order to form the material or undergoes a coating process in order to coat a support with a coating comprising the material, the powder being formed by particles which comprise a matrix into which precipitates are incorporated, the chemical composition of the powder being such that:
  i) the powder comprises the following elements, as a percentage by weight:
     16% to 20% of chromium,
     8% to 14% of nickel,
     0.001% to 0.030% of carbon,
     0.001% to 0.050% of oxygen,
     0% to 2% of manganese,
     0% to 3% of molybdenum,
     0% to 1% of silicon,
     the remainder of these elements being constituted by iron;
  ii) the precipitates comprising at least one metallic element selected from a metallic element M, a metallic element M', a metallic element M" or mixtures thereof; the metallic elements being selected independently of each other among yttrium, titanium, iron, chromium, tungsten, silicon, zirconium, thorium, magnesium, manganese, aluminium, hafnium, molybdenum or mixtures thereof;
  the microstructure of the steel being such that the grains are equiaxial and the average size of the grains being such that the average of their largest dimension "Dmax" and/or the average of their smallest dimension "Dmin" is in the range 10 μm to 50 μm, preferably 10 μm to 30 μm.

The inventors have identified a particular steel powder which, when it undergoes a consolidation process, results in a steel material with microstructural characteristics which are optimised for resisting mechanical and/or thermal stresses.

The steel powder may be obtained conventionally by gas atomisation under nitrogen or argon, but may also be obtained by water atomisation, in particular if the powder is then treated by a selective laser melting (SLM) process.

The expression "the remainder of these elements" means that it is the sum of the explicitly mentioned chemical elements that makes up to a total of 100% in the steel powder or in the steel material of the invention. Thus, this does not exclude other chemical elements from being contained in the powder.

The elemental composition of the precipitates may be determined by energy dispersive X-ray spectroscopy (known as EDX) carried out using a Scanning Electron Microscope (SEM).

In general, the steel material obtained at the end of the manufacturing process of the invention is as defined in the present description, in particular in accordance with one or more of the variations described for this material, such as the microstructure and/or the composition of the material, for example. Unless mentioned otherwise, any of the characteristics of the precipitates or of the matrix contained in the steel powder which undergoes the manufacturing process of the invention is, for example, identical to the corresponding characteristics of the precipitates or of the matrix contained in the steel material of the invention, this characteristic being described in more detail in the description of the steel material. More particularly, unless mentioned otherwise, the size, the distribution of the precipitates in the matrix, or the chemical composition of the precipitates or of the matrix are not modified between the steel powder and the steel material of the invention.

Concerning the steel powder more particularly, the particles of the powder may have a median diameter ($d_{50}$) in the range 10 μm to 200 μm. The median diameter ($d_{50}$) of a powder is the size for which 50% of the population of the particles composing that powder has a size of less than $d_{50}$. It can be determined by means of a technique such as the laser diffraction method, via a granulometer as described, for example, in the standard ISO 13320 (2009-12-01 edition).

The apparent density of the powder measured by the standard ASTM B-212 may be in the range 3.5 g/cm³ to 4.5 g/cm³.

The true density of the powder may be in the range 7.95 g/cm³ to 8.05 g/cm³. It is measured using a pycnometer, for example.

The consolidation process used in the manufacturing process of the invention is an additive manufacturing process.

As indicated above, an additive manufacturing process comprises two steps which are reiterated until a finished solid material is obtained:
 1. Generating a layer of material with a fixed contour and thickness.
 2. Producing a new layer by adding material above the preceding layer.

At the end of the additive manufacturing process, the successive layers of material forming the material are stacked in a direction perpendicular to the platen of the 3D printer onto which the first layer of material has been deposited.

Additive manufacturing is described in more detail, for example, in the following documents which are hereby incorporated into the description by reference:
 F. Laverne et al., "Fabrication additive—Principes généraux" [Additive manufacturing—General principles], Techniques de l'ingénieur, Fascicule [Paper] BM7017 V2 (published 10 Feb. 2016).
 H. Fayazfara et al., "Critical review of powder-based additive manufacturing of ferrous alloys: Process parameters, microstructure and mechanical properties", Materials & Design, Volume 144, 2018, pages 98-128.
 T. DebRoy et al., "Additive manufacturing of metallic components—Process, structure and properties", Progress in Materials Science, Volume 92, 2018, pages 112-224.
 Ministère de l'économie et des finances, République Française [French Ministry of Economic and Financial Affairs], "Prospective—futur de la fabrication additive—rapport final" [Prospective—the future of additive manufacturing—final report], January 2017 edition, ISBN: 978-2-11-151552-9; in particular Appendix 2 (pages 205 to 220), especially when it describes additive manufacturing processes using a metallic powder (Appendix 2, Les procédés de fabrication [Manufacturing processes], paragraphs 3, 4 and 5).

More particularly, the additive manufacturing process may be selected from a selective laser melting process, a selective electron beam melting process, a selective laser sintering process, a laser spraying process or a binder spraying process.

The selective laser melting process (SLM) is carried out based on one or more of the following parameters, for example:
 the laser beam scans the steel powder at a scan speed in the range 50 mm/second (dense material) to 3000 mm/second (porous material);
 power of laser beam: 50 W to 1000 W;
 hatching distance: 25 μm to 150 μm;
 layer thickness: 15 μm to 80 μm.

The electron beam melting process (EBM) is carried out based on one or more of the following parameters, for example:
 power of electron beam: 50 W to 4000 W;
 speed of electron beam: 100 mm/s to 10000 mm/s;
 hatching distance: 50 μm to 150 μm;
 layer thickness: 40 μm to 75 μm.

The laser spraying process is carried out based on one or more of the following parameters, for example:
 power of laser: 400 W to 3000 W;
 rate of displacement of the nozzle: 150 mm/min to 1200 mm/min;
 flow rate of powder: 4 g/min to 15 g/min.

The thermal spraying process is selected, for example, from a flame spraying process, a two-wire electric arc spraying process or a plasma jet spraying process.

At the end of the manufacturing process of the invention in which the steel powder is subjected to a consolidation process, the material is, more particularly, in the solid form.

When the consolidation process is carried out in a mould, a solid part constituted by the material is obtained.

The present invention also concerns the steel material obtained or capable of being obtained by the manufacturing process of the invention.

The present invention also concerns a steel material wherein the grains of which it is composed comprise a matrix into which precipitates are incorporated, in which material:
 i) the material comprises the following elements, as a percentage by weight:
  16% to 20% of chromium,
  8% to 14% of nickel,
  0.001% to 0.030% of carbon,
  0.001% (preferably 0.030%) to 0.050% of oxygen,
  0% to 2% of manganese,
  0% to 3% of molybdenum,
  0% to 1% of silicon, the remainder of these elements being constituted by iron;

ii) the precipitates comprising at least one metallic element selected from a metallic element M, a metallic element M', a metallic element M" or mixtures thereof; the metallic elements being selected independently of each other among yttrium, titanium, iron, chromium, tungsten, silicon, zirconium, thorium, magnesium, manganese, aluminium, hafnium, molybdenum or mixtures thereof;

the microstructure of the steel being such that the grains are equiaxial and the average size of the grains being such that the average of their largest dimension "Dmax" and/or the average of their smallest dimension "Dmin" is in the range 10 μm to 50 μm, preferably in the range 10 μm to 30 μm (or even optionally in the range 15 μm to 25 μm).

The average grain size of the material is measured by the intercept method as described, for example, in:
"https://en.wikipedia.org/wiki/Intercept_method",
the standard ASTM E112-10 described, for example, in the document "fushunspecialsteel.com/wp-content/uploads/2015/09/ASTM-E112-2010-Standard-Test-Methods-for-Determining-Average-Grain-Size.pdf".

The grains may be equiaxial in a plane which is parallel to the plane of the superimposed layers of material which result from the manufacture of material by an additive manufacturing process. In addition to the parallel plane, the grains may also be equiaxial in a plane which is perpendicular to the plane of the superimposed layers of material which result from the manufacture of material by an additive manufacturing process.

The interface between these superimposed layers, and thus the direction of these layers is generally visible by Scanning Electron Microscopy (SEM) or by optical microscopy.

Preferably, the equiaxial grains are such that the average ratio Dmax/Dmin between the largest dimension "Dmax" and the smallest dimension "Dmin" of a grain is in the range 1 to 2 (more particularly in the range 1 to 1.5).

The average ratio Dmax/Dmin is, for example, calculated by taking the average of the ratio Dmax/Dmin over at least 10 (or even at least 50) grains observed by Scanning Electron Microscope (SEM) imaging.

The material may have a relative density in the range 70.0% to 99.9%. The relative density can be used to ascertain the porosity of a material. It is measured using the Method of Archimedes, for example.

Concerning the composition of the precipitates contained in the steel material of the invention or in the steel powder used in the manufacturing process of the invention, the precipitates may comprise at least one metallic oxide, at least one metallic carbide, at least one oxymetallic carbide, at least one intermetallic compound, or mixtures thereof. Each of these oxide, carbide, oxycarbide or intermetallic compounds comprises at least one metallic element selected from metallic element M, metallic element M', metallic element M" or mixtures thereof; more particularly comprising metallic element M (more particularly titanium, iron, chromium or mixtures thereof), optionally metallic element M' optionally with metallic element M", or the mixture of these metallic elements.

The material of the invention or the steel powder used in the manufacturing process of the invention may comprise 0% to 1.5% by weight of metallic oxide (more particularly 0.1% to 1.5%).

The metallic oxide contained in the precipitates of the steel material of the invention or in the steel powder used in the manufacturing process of the invention is selected from at least one simple oxide, at least one mixed oxide or mixtures thereof.

More particularly, the metallic oxide is selected from at least one simple oxide $MO_{2-x}$ with the index X in the range 0 to 1, at least one mixed oxide $MM'_{y'}O_{5-x'}$, with the index X', which differs from 5, being in the range 0 to 5 and the index y', which is non-zero, being in the range 0 to 2, or at least one mixed oxide $MM'_{y'}M''_{y''}O_{5-x''}$, with the index X", which differs from 5, being in the range 0 to 5, the index y', which is non-zero, being in the range 0 to 2 and the index y" in the range 0 to 2, or mixtures of these oxides.

As an example, the index "x" is as follows for different compounds:
X=0: $TiO_2$
X=1: FeO
X=0.5: $Fe_2O_3$
X=2/3: $Fe_3O_4$ The index "y'" is, for example, equal to 0, 1 or 2.

The metallic element M contained in the simple oxide $MO_{2-x}$, the mixed oxide $MM'_{y'}O_{5-x'}$, or the mixed oxide $MM'_{y'}M''_{y''}O_{5-x''}$, is more particularly selected from yttrium, iron, chromium, titanium, aluminium, hafnium, silicon, zirconium, thorium, magnesium or manganese.

The metallic element M contained in the metallic oxide (in particular the simple oxide $MO_{2-x}$) is more particularly selected from titanium, iron or chromium.

The simple oxide $MO_{2-x}$ is, for example, selected from $Y_2O_3$, $Fe_2O_3$, FeO, $Fe_3O_4$, $Cr_2O_3$, $TiO_2$, $Al_2O_3$, $HfO_2$, $SiO_2$, $ZrO_2$, $ThO_2$, MgO, MnO, $MnO_2$ or mixtures thereof. More particularly, the simple oxide is $TiO_2$.

The metallic element M contained in the mixed oxide $MM'_{y'}O_{5-x'}$, is selected from iron or yttrium, for example.

The metallic element M' contained in the mixed oxide $MM'y'O_{5-x'}$ or the mixed oxide $MM'_{y'}M''_{y''}O_{5-x''}$ is more particularly selected from titanium or yttrium.

The mixed oxide $MM'_{y'}O_{5-x'}$, is selected from $FeTiO_3$, $Y_2Ti_2O_7$, $YTi_2O_5$ or mixtures thereof, for example. More particularly, the mixed oxide is $TiYO_{5-x'}$.

The mixed oxide $MM'_{y'}O_{5-x'}$, may be a pyrochlore, for example $Y_2Ti_2O_7$ or $YTi_2O_5$, or a mixture thereof.

The mixed oxide $MM'_{y'}M''_{y''}O_{5-x''}$ is, for example, of the "SiOAlMn" general formula type, denoted without any stoichiometric indices.

The precipitates contained in the steel material of the invention or in the steel powder used in the manufacturing process of the invention may also comprise at least one metallic carbide selected, for example, from at least one simple carbide or a mixed carbide.

More particularly, the metallic carbide is selected, for example, from at least one simple carbide $MC_{8-x}$ with the index X, which differs from 8, being in the range 0 to 8, at least one mixed carbide $MM'_{y'}C_{8-x'}$ with the index X', which differs from 8, being in the range 0 to 8 and the index y' in the range 0 to 5, or mixtures of these carbides.

The material or the steel powder used in the manufacturing process of the invention may comprise 0% to 0.9% (or even 0.1% to 0.9%) by weight of metallic carbide.

The metallic element M contained in the simple carbide $MC_{8-x}$ or the mixed carbide $MM'_{y'}C_{8-x'}$ is, for example, selected from iron, titanium, chromium, aluminium, tungsten or silicon.

The simple carbide $MC_{8-x}$ is, for example, selected from TiC, SiC, $AlC_3$, CrC or mixtures thereof.

The metallic element M' contained in the mixed carbide $MM'_yC_{8-x'}$ is, for example, selected from iron, titanium, chromium, aluminium, tungsten or silicon.

The mixed carbide $MM'_yC_{8-x'}$ is, for example, selected from $(FeCr)_7C_3$ or $(FeCr)_{23}C_6$.

The precipitates contained in the steel material of the invention or in the steel powder used in the manufacturing process of the invention may comprise at least one oxymetallic carbide comprising metallic element M, metallic element M', metallic element M" or mixtures thereof.

The material or the steel powder used in a manufacturing process of the invention may comprise 0% to 1.5% by weight of oxymetallic carbide (more particularly 0.1% to 1.5%).

The metallic oxide and the metallic carbide may coexist in the precipitates of the material or the steel powder used in the manufacturing process of the invention.

The oxymetallic carbide which may result from this may more particularly comprise a metallic oxide and a metallic carbide which have a composition as defined above.

More particularly, the precipitates of carbide and/or of oxycarbide may be localised at the boundaries of the grains forming the particles of steel powder or at the boundaries of the grains of which the steel material is composed, these precipitates having an average size in the range 10 nm to 100 nm, or even in the range 10 nm to 50 nm.

The precipitates contained in the steel material of the invention or in the steel powder used in the manufacturing process of the invention may also comprise at least one intermetallic compound comprising metallic element M, metallic element M' or even, optionally, metallic element M".

The material or the steel powder used in the manufacturing process of the invention may comprise 0% to 2% by weight of intermetallic compound (more particularly 0.1% to 1.5%).

The metallic element M contained in the intermetallic compound is iron, for example.

The metallic element M' contained in the intermetallic compound is titanium or yttrium, for example.

The metallic element M" contained in the intermetallic compound is chromium or tungsten, for example.

The intermetallic compound is, for example, selected from $YFe_3$, $Fe_2Ti$, FeCrWTi or mixtures thereof. FeCrWTi is a term which is known to the person skilled in the art, but it does not correspond to a true stoichiometric formula.

The precipitates incorporated into the matrix may also have the following characteristics for the steel material of the invention or the steel powder used in the manufacturing process of the invention.

The precipitates contained in the steel material or in the steel powder used in the manufacturing process of the invention may have an average size in the range 5 nm to 200 nm, preferably in the range 5 nm to 100 nm, yet more preferably in the range 5 nm to 70 nm.

The average size of the precipitates may be determined visually starting from a measurement made on an image obtained with a Scanning Electron Microscope (SEM), for subsequent processing with image processing software such as "ImageJ" software, for example, which is available from the following web site: https://imagej.net/Welcome.

The precipitates of metallic carbide may have an average size in the range 10 nm to 50 nm.

The precipitates of metallic oxide and/or of oxymetallic carbide may have an average size in the range 10 nm to 100 nm, more particularly in the range 20 nm to 70 nm.

The steel material of the invention or the steel powder used in the manufacturing process of the invention may comprise 0.1% to 1.5% by weight of precipitates. This precipitates content may, for example, be measured by selective dissolution with aqua regia.

The average density with which the precipitates are distributed in the matrix may be in the range 2 precipitates/$\mu m^3$ to 100 precipitates/$\mu m^3$.

It is determined by counting from images, for example, such as from Scanning Electron Microscopic (SEM) imaging, or from Transmission Electron Microscopy (TEM) imaging, for example.

In addition to the chemical elements cited above, the material or the steel powder used in the manufacturing process of the invention may comprise at least one of the following elements, as a percentage by weight:
  0% to 0.11% of nitrogen,
  0% to 0.045% of phosphorus,
  0% to 0.05% of sulphur,
  0% to 0.0300% of aluminium,
  0% to 2% of manganese,
  0% to 3% of molybdenum,
  0% to 0.003% of vanadium.

In addition to the chemical elements cited above, notably at the preceding paragraph, the material or the steel powder used in the manufacturing process of the invention may still comprise at least one of the following elements, as a percentage by weight:
  0% to 0.02% of cobalt,
  0% to 0.02% of titanium,
  0% to 0.02% of copper.

These supplemental chemical elements may be present in the matrix and/or in the precipitates.

The matrix may comprise, as a proportion by weight with respect to the weight of the material or with respect to the weight of the steel powder used in the manufacturing process of the invention, 0 ppm to 500 ppm of metallic element M, of metallic element M' and/or of metallic element M". In this case, it is the metallic element which is dissolved in the matrix, in contrast to that present in the precipitates.

More particularly, the metallic element M, M' or M" contained in the matrix may be selected from yttrium, titanium, tungsten, zirconium, thorium, aluminium, hafnium, silicon, manganese or molybdenum.

The material or the steel powder used in the manufacturing process of the invention may have an austenitic structure.

The matrix (and thus by extension the steel material of the invention or the steel powder used in the manufacturing process of the invention) may have the chemical composition of a 316 L or 304 L type steel, for example as respectively specified in the standards ASTM A666 or RCC-MRx.

The microstructure of the material may be such that the grains of which it is composed have a cellular structure. This cellular sub-structure is, for example, illustrated in the document "Techniques de l'ingénieur—fascicule [paper] M140v3: Mécanismes de fluage. Effet de la microstructure du matériau Essais de fluage [Creep mechanisms. Effects of the microstructure of the material. Creep tests]. Author(s): François SAINT-ANTONIN—publication date: 10 Jul. 1995".

The grains with a cellular structure are, for example, composed of cells with an average size in the range 300 nm to 2 μm.

Regarding the mechanical properties of the steel material of the invention, they generally have at least one of the following values:

elongation at break "A" of 35% to 85%, and/or

"Rp0.2" yield strength of 190 MPa to 700 MPa, and/or maximum tensile strength "Rm" of 400 MPa to 900 MPa.

The present invention also concerns a treatment process in which a steel material undergoes hot isostatic pressing, the material being such that the grains of which it is composed comprise a matrix into which precipitates are incorporated and such that:

i) the material comprises the following elements, as a percentage by weight:

16% to 20% of chromium,

8% to 14% of nickel, 0.001% to 0.030% of carbon, 0.001% to 0.050% of oxygen,

0% to 2% of manganese,

0% to 3% of molybdenum,

0% to 1% of silicon, the remainder of these elements being constituted by iron;

ii) the precipitates comprising at least one metallic element selected from a metallic element M, a metallic element M', a metallic element M" or mixtures thereof; the metallic elements being selected independently of each other among yttrium, titanium, iron, chromium, tungsten, silicon, zirconium, thorium, magnesium, manganese, aluminium, hafnium, molybdenum or mixtures thereof;

the microstructure of the steel being such that the grains are equiaxial and the average size of the grains being such that the average of their largest dimension "Dmax" and/or the average of their smallest dimension "Dmin" is in the range 10 μm to 50 μm.

The hot isostatic pressing may comprise the following steps in succession, carried out in a chamber comprising an inert gaseous atmosphere under a pressure in the range 120 bar to 1800 bar:

a) the material is heated to a constant temperature in the range 600° C. to 1400° C. at a temperature ramp-up rate in the range 500° C./hour to 1000° C./hour;

b) the constant temperature is maintained for a period in the range 15 minutes to 5 hours;

c) the constant temperature is reduced at a temperature ramp-down rate in the range 500° C./hour to 1000° C./hour in order to reach ambient temperature.

The ambient temperature is typically 25° C.

The inert gaseous atmosphere (i.e., chemically inert in respect of the material as at the start and end of the treatment process) may comprise a gas selected, for example, from argon, helium or a mixture thereof.

In general, the steel material which undergoes the treatment of the manufacturing process of the invention is as defined in the present description, in particular in accordance with one or more of the variations described for this material in respect of the microstructure and/or the composition of the material, for example.

The present invention also concerns a part composed entirely or in part of a steel material, the grains of which it is composed comprising a matrix into which precipitates are incorporated and such that:

i) the material comprises the following elements, as a percentage by weight:

16% to 20% of chromium,

8% to 14% of nickel, 0.001% to 0.030% of carbon, 0.001% to 0.050% of oxygen,

0% to 2% of manganese,

0% to 3% of molybdenum,

0% to 1% of silicon, the remainder of these elements being constituted by iron;

ii) the precipitates comprising at least one metallic element selected from a metallic element M, a metallic element M', a metallic element M' or mixtures thereof; the metallic elements being selected independently of each other among yttrium, titanium, iron, chromium, tungsten, silicon, zirconium, thorium, magnesium, manganese, aluminium, hafnium, molybdenum or mixtures thereof;

the microstructure of the steel being such that the grains are equiaxial and the average size of the grains being such that the average of their largest dimension "Dmax" and/or the average of their smallest dimension "Dmin" is in the range 10 μm to 50 μm.

The part may have a cellular structure or an alveolar structure as described, in particular, in the document FR 2 932 705 A1 (in particular the parts illustrated in FIGS. 1 to 14 and as commented upon in the description of that document) and/or the dissertation "Développement d'une nouvelle technique d'élaboration de mousses acier par fonderie et caractérisation mécanique" [Development of a novel technique for manufacturing steel foams by smelting and mechanical characterization] by Jonathan Dairon (in particular pages 109 to 112), available from the following address: https://tel.archives-ouvertes.fr/tel-00694478/document.

More particularly, the part has a honeycomb structure, a lattice structure or a foam structure.

The largest dimension of the cell or of the alveolus respectively forming the cellular structure or the alveolar structure may be in the range 1 nm to 1 cm or in the range 5 cm to 10 cm.

The part may be a shock absorber.

In general, the steel material which composes all or a portion of the part of the invention is as defined in the present description, in particular in accordance with one or more of the variations described for this material such as, for example, the microstructure and/or the composition of the material.

The present invention also concerns a process for the manufacture of a part as defined in the present description, in particular in accordance with one or more of the variations described for this part such as, for example, the structure (in particular the cellular or alveolar structure, particularly a honeycomb structure, a lattice structure or a foam structure) and/or the composition of the material, or even of the material obtained after the treatment process of the invention.

The process for the manufacture of a part in accordance with the invention is such that the part is manufactured by means of an additive manufacturing process. More particularly, the additive manufacturing process is selected from a selective laser melting process, a selective electron beam melting process, a selective laser sintering process, a laser spraying process or a binder spraying process.

The process for the manufacture of the part may be followed by a treatment process comprising a step for hot isostatic pressing.

This step for hot isostatic pressing may comprise the following steps in succession, carried out in a chamber comprising an inert gaseous atmosphere under a pressure in the range 120 bar to 1800 bar:

A. the material is heated to a constant temperature in the range 600° C. to 1400° C. using a temperature ramp-up rate in the range 500° C./hour to 1000° C./hour;
B. the constant temperature is maintained for a period in the range 15 minutes to 5 hours;
C. the constant temperature is reduced at a temperature ramp-down rate in the range 500° C./hour to 1000° C./hour in order to reach ambient temperature.

The inert gaseous atmosphere may comprise a gas selected from argon, helium or a mixture thereof.

The invention is advantageously complemented by the following characteristics, taken alone or in accordance with any one of their technically feasible combinations.

DETAILED DISCLOSURE OF THE INVENTION

In the present description of the invention, a verb such as "comprise", "incorporate", "include", "contain" and its conjugated forms are open terms and thus do not exclude the presence of additional element (s) and/or step (s) adding to the initial element(s) and/or steps mentioned after these terms. However, these open terms also encompass a particular embodiment in which only the initial element(s) and/or step(s), to the exclusion of any others, are envisaged; in which case, the open term also encompasses the closed term "consist of", "constitute", "compose of" and its conjugated forms.

Unless indicated otherwise, the use of the indefinite article "a" or "an" for an element or a step does not exclude the presence of a plurality of elements or steps.

Any reference symbol between parentheses in the claims should not be interpreted as limiting the scope of the invention.

Furthermore, unless indicated otherwise:
limiting values are included in the indicated ranges of parameters (except, for example, in the case of the explicit exclusion of the value of a limit);
unless the margin of error is indicated, the degrees of uncertainty for the values mentioned are such that the maximum error for the last figure indicated must be estimated from rounding conventions. As an example, for a measurement of 3.5, the margin of error is 3.45-3.54;
the temperatures indicated are considered for an implementation at atmosphere pressure;
all percentages by weight for a powder or for a material are with respect to the total weight of that powder or that material;
the indices mentioned in the formulae for the metallic precipitates (oxides, carbides, oxycarbides and intermetallic compounds) are stoichiometric indices and not indices by weight, as is sometimes the case in metallurgy.

The expression "in accordance with one or more of the variations described in the present description" for a material (in particular the steel material of the invention or the steel powder used in the manufacturing process of the invention) or an element, refers in particular to the variations which concern the chemical composition and/or the proportion of the constituents of that material and any supplemental chemical species which it might possibly contain and in particular to variations which concern the chemical composition, structure, geometry, arrangement in space and/or chemical composition of that element or of a constituent sub-element of the element. These variations are, for example, those that are indicated in the claims.

Other aims, characteristics and advantages of the invention will now be described in detail in the description below of particular embodiments of the invention, given by way of non-limiting illustration, with reference to the accompanying FIGS. 1 to 20.

BRIEF DESCRIPTION OF THE FIGURES

FIG. 1 represents a table indicating ranges of overall contents by weight for the chemical elements composing the steel powder of the invention as well as, by way of comparison, corresponding contents as defined in the standards ASTM A666 and RCC-MRx.

FIG. 2 represents a table detailing the content by weight and the atomic content of the chemical elements in the matrix and in the precipitates of a steel powder in accordance with the invention.

FIG. 3 represents a table indicating the content by weight of the chemical elements in the steel material of the invention, in the matrix, the oxide precipitates, the carbide precipitates and the oxycarbide precipitates.

FIG. 13 represents a table indicating the overall content by weight of the chemical elements of a reference steel powder.

FIG. 14 represents a table indicating the content by weight of the chemical elements composing the matrix and the precipitates of a reference steel powder.

FIG. 20 represents a table indicating the mechanical properties of the steel material of the invention and of a reference steel material (in a direction parallel to and perpendicular to the direction z of additive manufacture of the material), as well as the anisotropy of these properties.

DESCRIPTION OF PARTICULAR EMBODIMENTS

Figure 4:
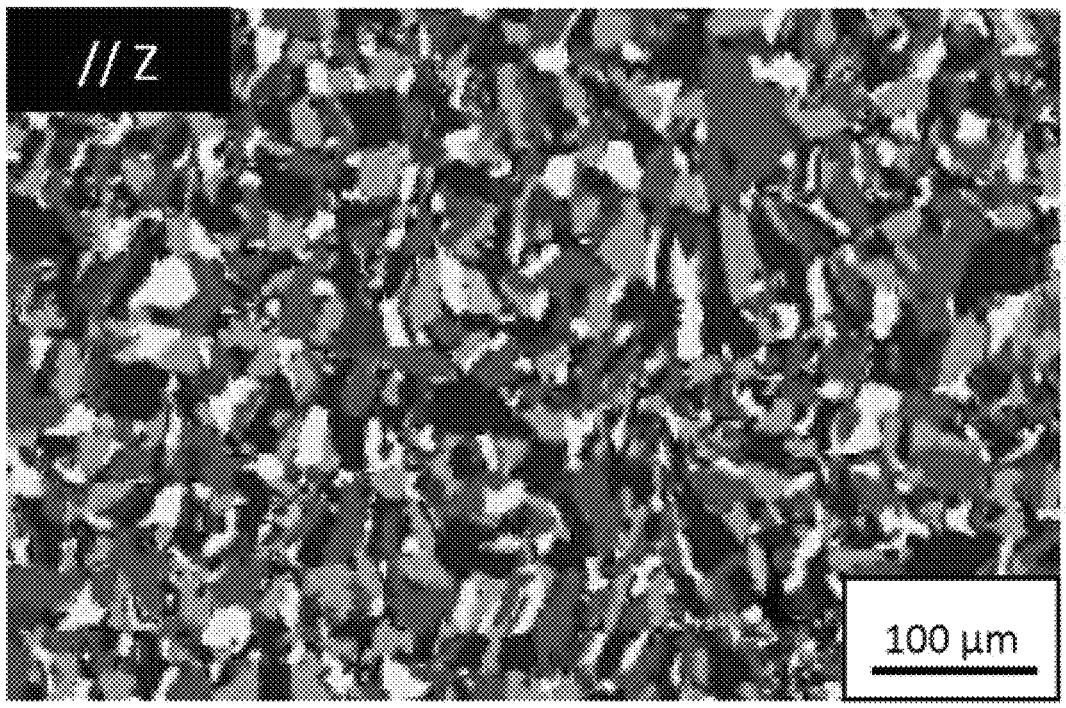
FIGS. 4 and 5 represent images obtained by Electron Backscattered Diffraction of a steel material of the invention, respectively in a plane parallel to and in a plane perpendicular to the direction z of additive manufacture of the material.

1. Steel Powder Used in the Manufacturing Process of the Invention

In general, the steel powder had a composition as shown in FIG. 1, namely a composition by weight encompassing that of a steel complying with the ASTM A666 and RCC-MRx standards (the RCC-MRx standard corresponds to the rules for the design and construction of mechanical equipment for high temperature, experimental and fusion nuclear facilities. It is a technical document for the production of components for Generation IV nuclear reactors).

1.1 Characterization of Steel Powder.

1.1.1 Chemical Composition.

A steel powder (316 L steel with reference FE-271-3/ TruForm 316-3—batch no. 12-034043-10, sold by Praxair) was analysed by X ray microanalysis, more precisely by Energy Dispersive X-ray Spectroscopy (EDX) using a Scanning Electron Microscope (SEM)), as well as by Glow Discharge Mass Spectrometry (GDMS), by Inductively Coupled Plasma-Optical Emission Spectrometry (ICP-OES) and by Instrumental Gas Analysis (IGA).

The elemental composition of the matrix and of the precipitates of the steel powder obtained was determined by compiling these various measurements. The proportions obtained for each chemical element are expressed with a relative uncertainty of 3%:

- as a % by weight with respect to the total weight of the matrix. However, by convention, the unmeasured chemical elements are subtracted for the matrix. It was then assumed that the remaining percentage by weight was constituted by iron.
- as a % by weight and as an atomic % with respect to the total weight of precipitates contained in the steel powder.

These proportions were normalised by assigning a value of 100 to the total weight or the total number of atoms. They are reproduced in FIG. 2, which shows that the precipitates are rich in oxides of aluminium, titanium, silicon and manganese in the form of a simple oxide and/or mixed oxide. The precipitates may optionally contain carbides or oxycarbides of these chemical elements which, however, would not have been detected by SEM because of their small size.

1.1.2 Morphology.

The steel powder had a 100% austenitic structure, as shown by an Electron Backscattered Diffraction ("EBSD") analysis.

The particles of this powder comprise grains agglomerated into particles which are most usually substantially spherical. They have a diameter in the range 10 µm to 100 µm, and an average diameter of 34 µm. More particularly, the median diameters $D_{10}$, $D_{50}$ and $D_{90}$ (for which, respectively, 10%, 50% and 90% of the population of the particles composing this powder had a size which was below the median diameter under consideration) measured by laser granulometry in accordance with the standard ISO 13320 (2009-12-01 edition) were as follows: $D_{10}$=22 µm, $D_{50}$=32 µm, and $D_{90}$=48 µm.

The precipitates contained in the particles of the powder are most often spherical. Their maximum dimensions (which therefore most often correspond to the diameter of the spherical particle) were such that the size measured by Scanning Electron Microscope (SEM) imaging was generally in the range 24 nm to 120 nm. Their corresponding average size was 63 nm.

The density with which the precipitates were distributed in the matrix was measured by counting using SEM imaging: it was in the range 2 precipitates/µm³ to 100 precipitates/µm³. The corresponding average density was 6 precipitates/µm³.

1.1.3 Properties.

The apparent density of the steel powder, measured by the standard ASTM B-212, was 4 g/cm³±0.01 g/cm³. Its true density, measured by helium pycnometry, was 7.99 g/cm³±0.03 g/cm³.

The Hall flow rate (capacity to make 50 g of powder flow through an orifice of fixed dimensions), measured in accordance with the standard ASTM B213, was more than 40 seconds.

2. Manufacturing Process in Accordance with the Invention

A part composed of a steel material in accordance with the invention was manufactured by additive manufacture with the Selective Laser Melting (SLM) process using a Trumpf TruPrint Series 1000 model printer.

In order to manufacture the part, on a substrate of stainless steel, the laser scanned a plurality of 4 mm sided squares in succession, distinguished by a scan direction perpendicular to that of the preceding layer. At the end of this first scan, a first layer n in the form of a checkerboard was obtained. After a second scan carried out on the layer n in which a fresh rotation by 90° of the laser scan direction had been carried out, a new layer n+1 was superimposed on the subjacent layer n.

The principal operating parameters of the S-LM process were as follows:

- Yb fibre laser with wavelength of 1.064 nm;
- diameter of spot laser=55 µm;
- power of laser=150 W;
- scan speed of laser=675 mm/s;
- distance between two successive laser tracks ("Hatching distance")=90 µm;
- thickness of bed of powder=20 µm;
- composition of gaseous medium of the build chamber=argon, with an oxygen content of less than 100 ppm during consolidation.

Five cylindrical specimens (length=40 mm and diameter=8 cm) built with axes X and Z and five parallelepipedal specimens (10 mm×10 mm×15 mm) were obtained. After manufacture, the parts were removed by cutting specimens from the base in order to separate them from the stainless steel substrate.

The cylindrical specimens were then machined for the tensile tests. The parallelepipedal specimens were used for all of the composition and microstructure analyses.

No supplemental treatments were applied to the unrefined material obtained.

The density of the steel material constituting the specimens was 7.93 g/cm$^3$ (measured using the Method of Archimedes), i.e. a relative density of 99.25%, assuming that the theoretical density for a 316 L steel is 7.99 g/cm$^3$.

This density could be increased by modifying at least one of the following parameters until a relative density of more than 99% was reached without, however, modifying the grain size of the steel material:

power of laser=50 W to 400 W;

scan speed of laser=50 mm/s to 3000 mm/s.

The density generally varies with the power of the laser or the scan speed of the laser in a parabolic manner. However, too low or too high a power or scan speed could possibly reduce the density.

The distance between two successive laser tracks ("Hatching distance") was in the range 30 μm to 90 μm, for example.

3. Characterization of the Steel Material Obtained by the Manufacturing Process in Accordance with the Invention 3.1.1 Chemical Composition.

The overall chemical composition of the steel material obtained by the manufacturing process described in the preceding example complied with the standards ASTM A666 and RCC-MRx indicated in the table of FIG. 1.

The elemental composition of this alloy was measured by EDX analysis. It was very similar to that of the steel powder used to manufacture the steel material. However, in the steel material, the chemical elements are distributed differently between the matrix and the oxide, carbide or oxycarbide precipitates (namely, for example, a mixture of oxide and carbide): their percentages by weight, measured locally on one or more of these precipitates, are indicated in the table of FIG. 3 with a relative uncertainty of 3%.

This table shows that the metallic oxides (in the form of a simple oxide and/or mixed oxide) are rich in chromium, iron and nickel in particular, but also in aluminium, titanium, silicon or manganese. The carbides (in the form of simple carbides and/or of mixed carbides) are rich in iron or chromium in particular, and silicon or manganese to a lesser extent. The oxycarbides are in fact rich in chromium, manganese, iron, and silicon, titanium and nickel to a lesser extent.

3.1.2 Morphology.

An analysis by Electron Backscattered Diffraction ("EBSD") showed that the steel material has a 100% austenitic structure.

The oxide, carbide and oxycarbide precipitates were incorporated into the matrix of the grains which constituted the steel material or into the spaces between these grains (grain boundaries). The average density with which these precipitates were distributed in the matrix was 6 precipitates/μm$^3$.

The average size of the oxide precipitates was in the range 10 nm to 100 nm; that for carbide was in the range 10 nm to 50 nm; that for the oxycarbide precipitates was in the range 10 nm to 100 nm.

One of the particular features of the material of the invention is a microstructure such that the grains comprising this material are equiaxial in structure. In particular, when the material of the invention is obtained by additive manufacture, its grains may be equiaxial in a plane parallel to the direction of additive manufacture (which in general corresponds to a plane which is substantially perpendicular to the direction of the layers successively obtained during manufacture).

Figure 5:
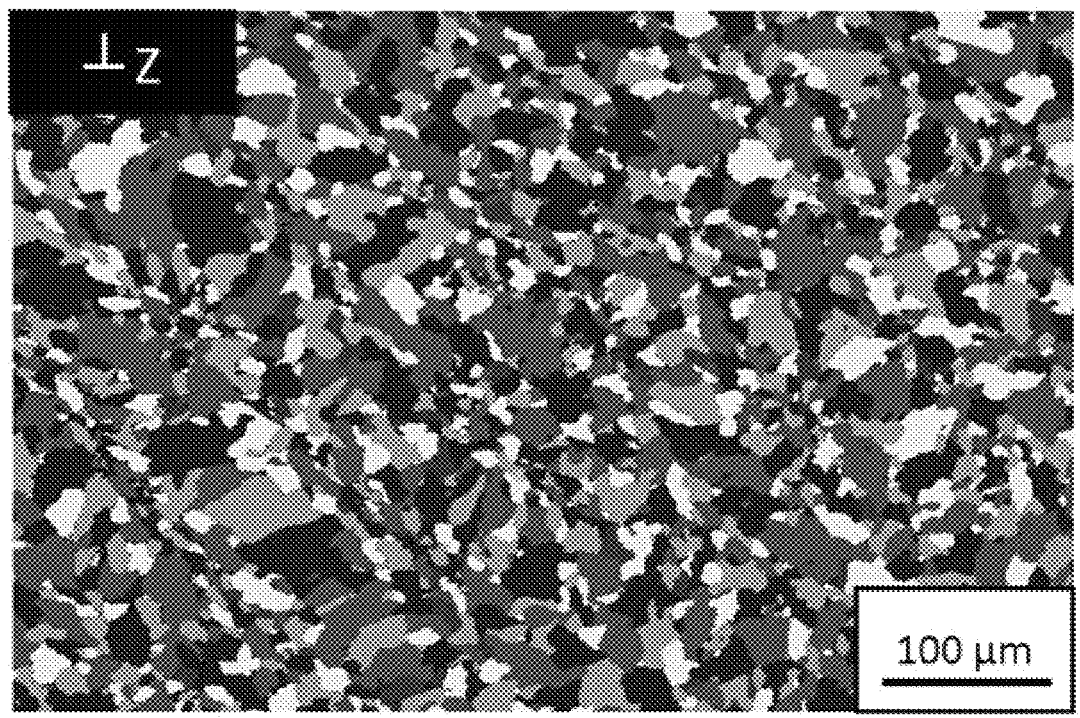

This particular microstructural feature of the material of the invention is illustrated in FIGS. 4 and 5, which show the equiaxial structure of the grains in a plane respectively parallel to and a plane perpendicular to the direction z of additive manufacture of the steel material.

These grains had an average width (Dmin) of 16.2 μm±1.5 μm and an average length (Dmax) of 20.6 μm±1.5 μm, i.e. an average ratio Dmax/Dmin of 1.34±0.13.

Figure 6:
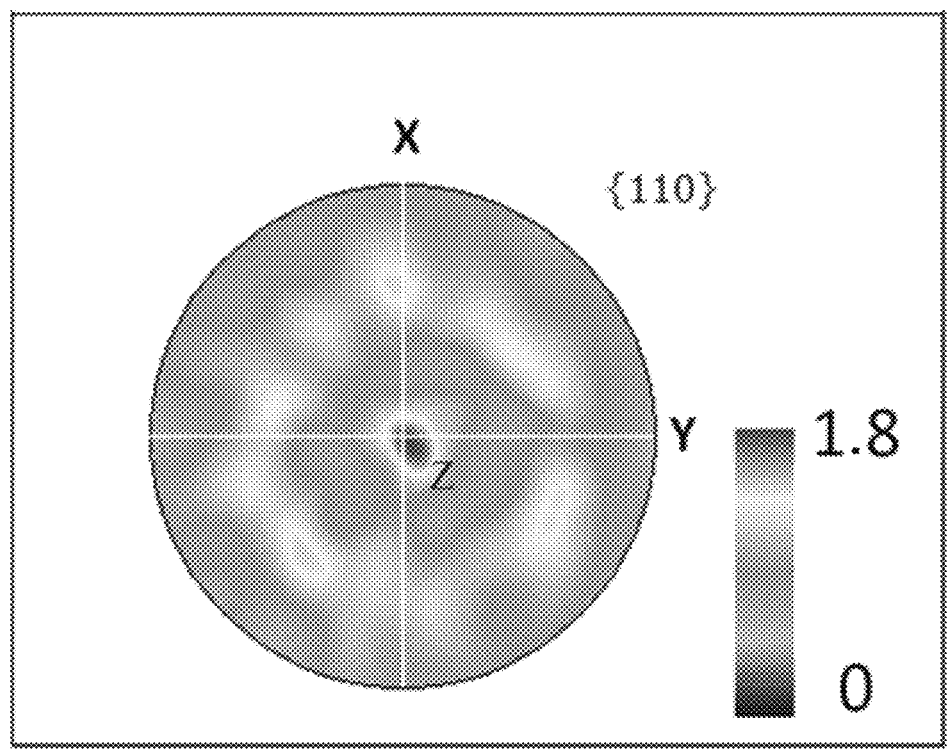
FIG. 6 is a pole figure for the steel material of the invention obtained from data collected by Electron Backscattered Diffraction (EBSD).

Furthermore, the crystallites which form the grains of the steel material have a preferential orientation. As illustrated in FIG. 6, this texture of the material is reflected by the fact that the (110) directions are preferentially orientated parallel to the build direction Z, but also by a texture intensity equal to 1.9.

Figure 7:
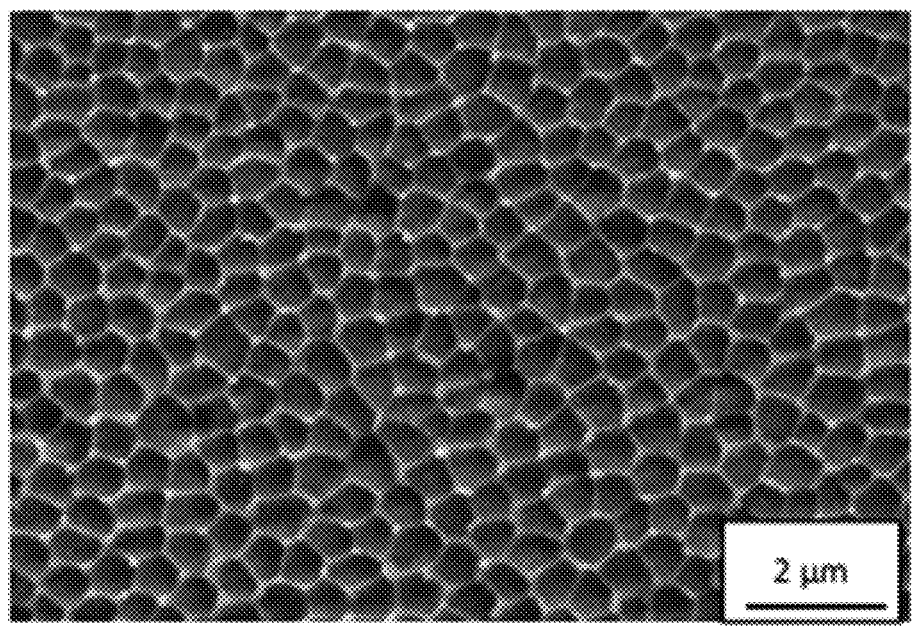
FIG. 7 is an image obtained by Scanning Electron Microscopy (SEM) showing the cells present inside the steel material of the invention.

As illustrated in FIG. 7, the grains of steel material are themselves constituted by cells which are nanometric in scale (more particularly a size of less than the average diameter of 500 nm).

Figure 8:
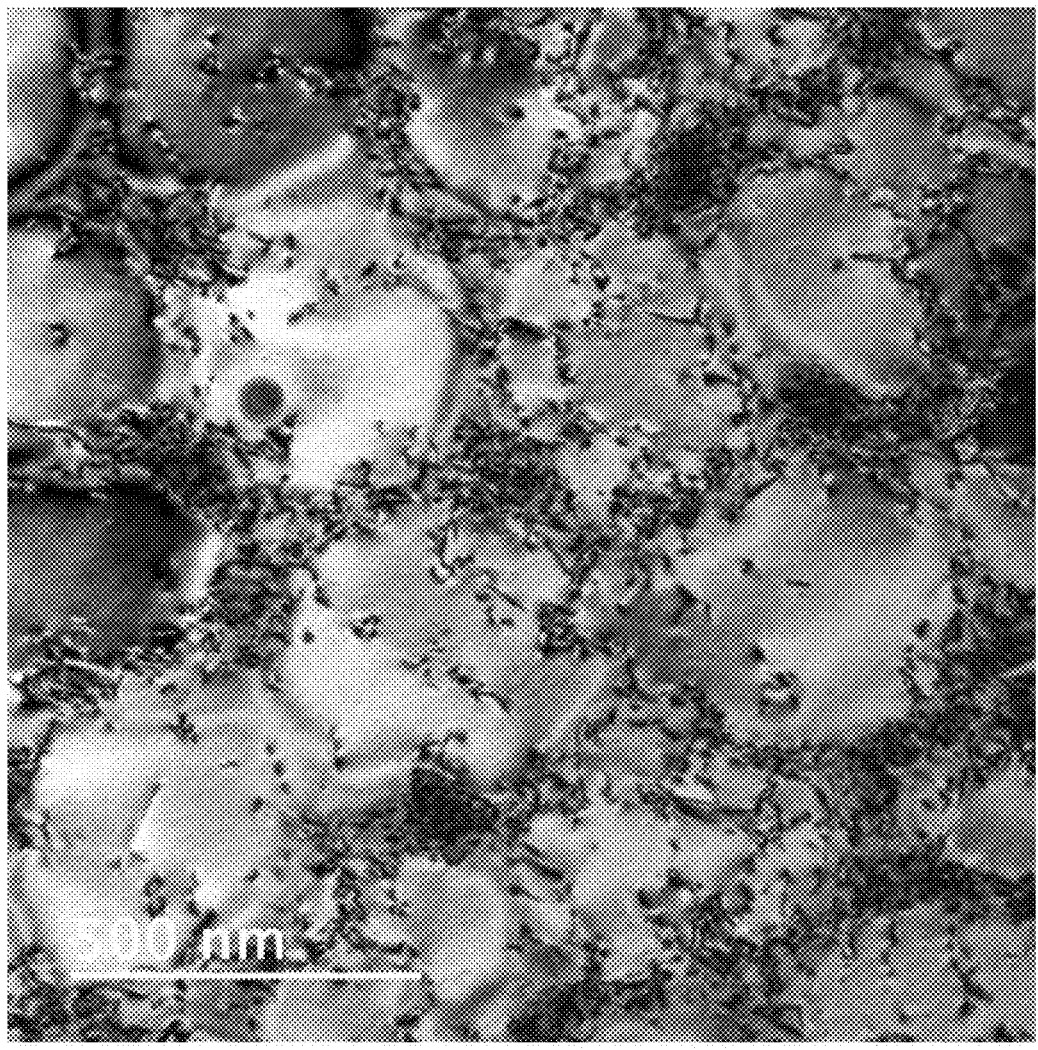
FIG. 8 is a micrograph obtained by Transmission Electron Microscopy (MET) of a thin slice of the steel material of the invention.

FIG. 8 also illustrates this cellular structure while also highlighting the precipitates incorporated into the matrix, which itself is paler in colour.

3.1.3 Properties.

The mechanical properties of the steel material are as follows:

Vickers HV1 microhardness (1 kg for 10 seconds):

202±3 HV1 in the plane parallel to the direction Z of manufacture and 202±3 HV1 in the plane perpendicular to the direction Z of manufacture;

tensile tests at ambient temperature (25° C.) and irrespective of the direction of measurement with reference to the direction Z of manufacture:

Rm (maximum tensile strength)=645±30 MPa;

Rp0.2 (yield strength)=453±35 MPa;

A (elongation at break)=54±9%.

Thus, advantageously, the steel material obtained directly from the manufacturing process of the invention (namely the unrefined material which has not undergone any supplemental treatment such as a heat treatment, for example) has optimised mechanical properties which are, furthermore, homogeneous in all directions (isotropic nature of these properties).

4. Treatment Process in Accordance with the Invention

The steel material manufactured in accordance with the preceding example underwent the treatment process of the invention comprising a step for hot isostatic pressing (HIP).

This HIP consisted of heating the material, under an atmosphere of argon at a pressure of 1800 bar, from ambient temperature (25° C.) to a constant temperature of 1100° C. which was maintained for 3 hours, and then returning it to ambient temperature. The temperature ramp-up or ramp-down rate was 800° C./hour.

As an alternative, the constant temperature could have been in the range 600° C. to 1400° C.

5. Characterization of Steel Material Obtained by the Treatment Process in Accordance with the Invention

5.1.1 Morphology.

The treated material no longer had a cellular structure.

Figure 9:
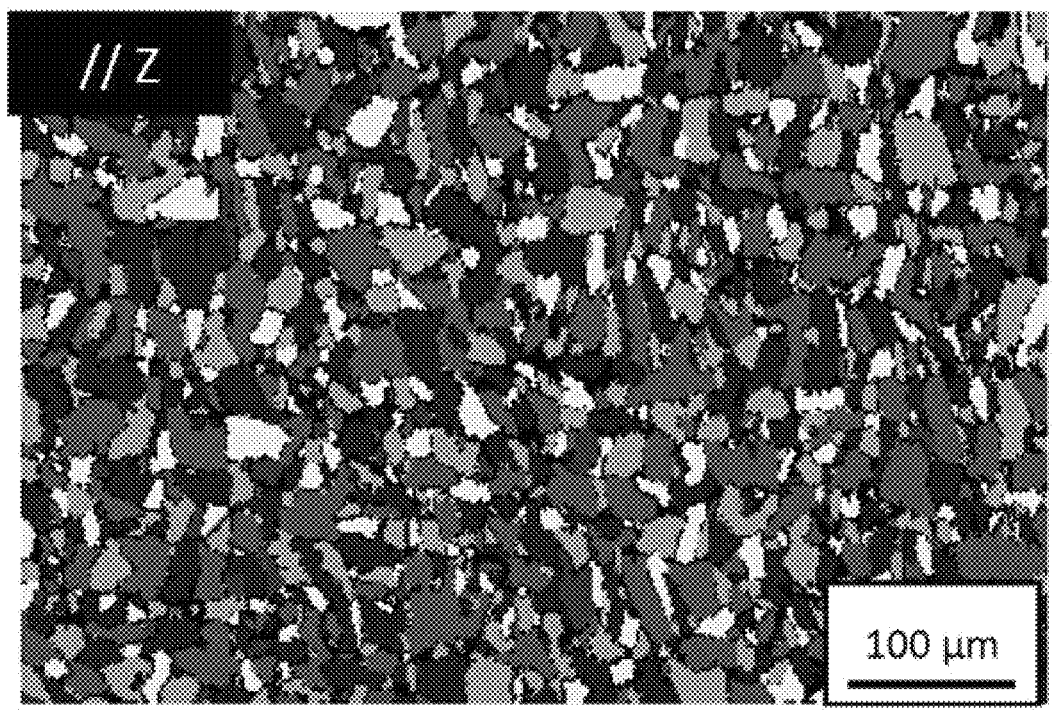
FIG. 9 and
FIGS. 9 and 10 represent images obtained by Electron Backscattered Diffraction of a steel material which has undergone the treatment process of the invention, respectively in a plane parallel to and a plane perpendicular to the direction z of additive manufacture of the material.
Figure 10:
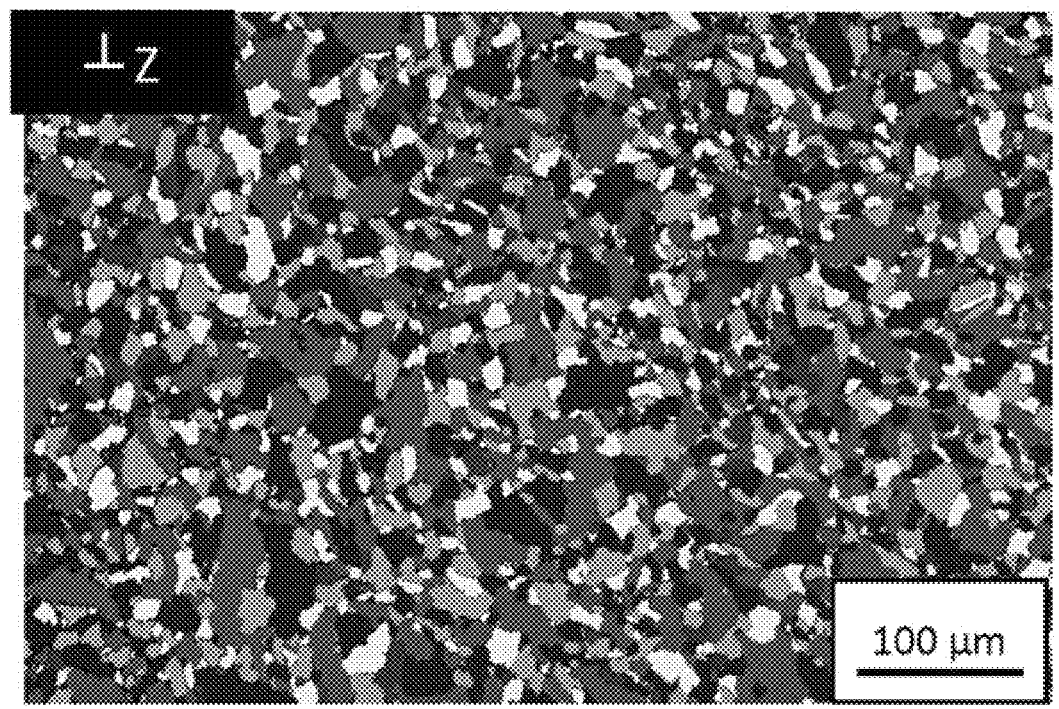

In contrast, phase mapping by Electron Backscattered Diffraction ("EBSD") showed that the treated material still had a 100% austenitic structure, as well as equiaxial grains, as illustrated in FIGS. 9 and 10, which show the equiaxial structure of the grains in a plane respectively parallel to and perpendicular to the direction z of additive manufacture of the steel material undergoing the treatment process of the invention.

These grains had an average width of 15.9 µm±2.2 µm and an average length of 21.5 µm±1.2 µm, i.e. an average ratio Dmax/Dmin of 1.36±0.16.

Figure 11:
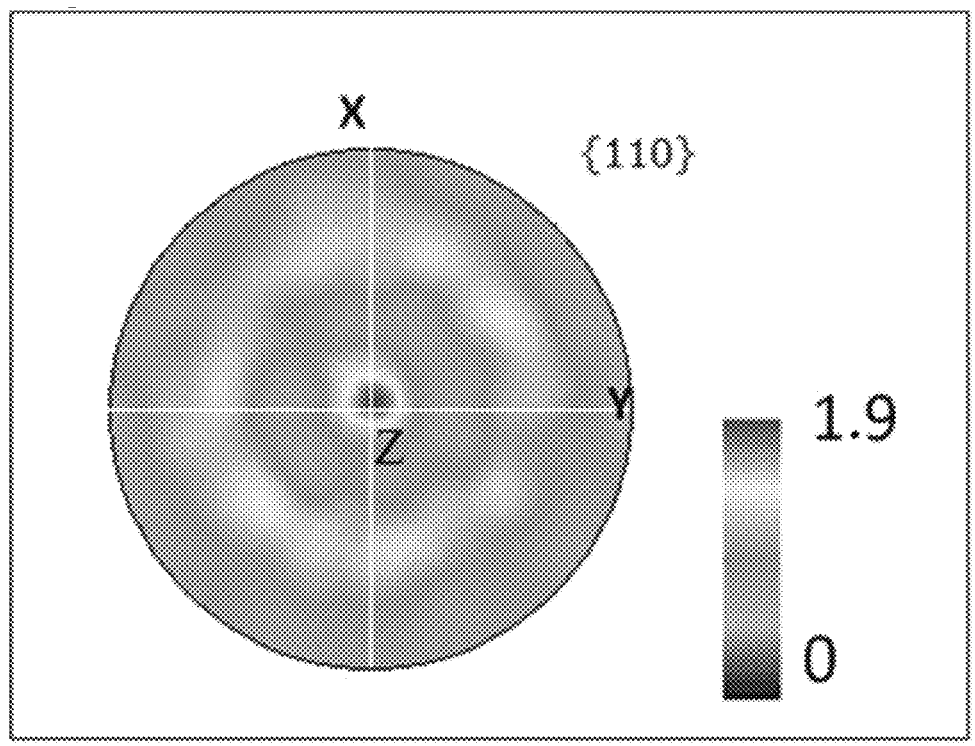
FIG. 11 is a pole figure for steel material which has undergone the treatment process of the invention, obtained from data collected by EBSD.

As illustrated in FIG. 11, the treated material was still structured, since the (110) directions are preferentially orientated parallel to the build direction Z.

The misorientation angle between two grain boundaries was measured using the pole figure technique. In theory, after a treatment by hot isostatic pressing, the grains of a steel material are assumed to increase in size and/or in number. This change then modifies the distribution of the misorientation angles.

Figure 12:
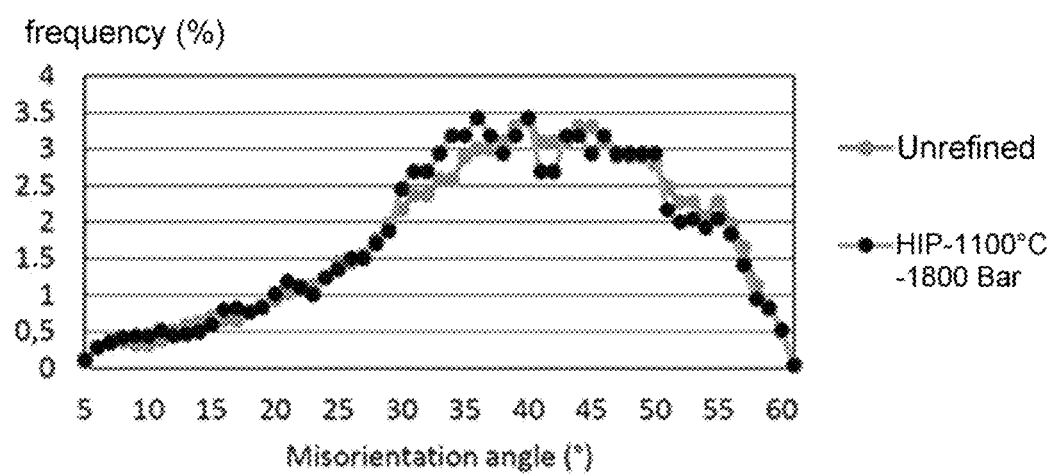
FIG. 12 represents a graph expressing the misorientation angle expressed in degrees as a function of the frequency, expressed as a %, for the steel material of the invention before ("unrefined") and after having undergone the treatment process of the invention ("HIP").

However, FIG. 12 shows that the misorientation angle between the grains did not vary significantly after the steel material had been treated by the treatment process of the invention. This provides evidence of an absence of modification to the size of the grains.

Apart from the cellular structure, these various data show that the morphology of the steel material is advantageously stable (in particular the variation in the size of the grains is minor), even after having undergone the treatment process of the invention which, however, combines the application of variations in temperature and in pressure.

This stability in the morphology of the steel material of the invention is advantageous, for example when its creep behaviour is considered when a pressure and/or temperature stress is applied to the material.

5.1.2 Properties.

The mechanical properties of the steel material which has undergone the treatment process of the invention are as follows:

Vickers HV1 microhardness (1 kg for 10 seconds):

175±1.5 HV1 in the plane parallel to the direction Z of manufacture and 172±2 HV1 in the plane perpendicular to the direction Z of manufacture: the microhardness with respect to the untreated material was thus reduced, but was advantageously isotropic;

tensile tests at ambient temperature (25° C.) and irrespective of the direction of measurement with respect to the direction Z of manufacture:

Rm (maximum tensile strength)=622±22 MPa;

Rp0.2 (yield strength)=336±8 MPa;

A (elongation at break)=76±4%.

These various mechanical properties are advantageously isotropic, namely irrespective of the direction in which they are measured. The isotropic tensile behaviour of the steel material of the invention is relatively stable over time.

The density of the treated steel material constituting specimens with a geometry similar to those of the unrefined steel material was 7.94 g/cm$^3$±0.05 g/cm$^3$ (measured using the Method of Archimedes), i.e. a relative density of 99.4%±0.06%, assuming that the theoretical density for a 316 L steel is 7.99 g/cm$^3$.

The density of the steel material which had undergone the treatment process of the invention was thus almost identical to that of the corresponding unrefined material.

6. Comparative Example

By way of comparison, a reference steel powder (Stainless Steel 316L-A LMF powder—batch no. 201600024, sold by Trumpf) underwent an additive manufacturing process in accordance with the operating parameters of Example 2, in order to obtain a solid reference steel material.

The chemical composition of this powder was determined by energy dispersive X-ray spectroscopy (known as "EDX") carried out by SEM, GDMS, ICP-OES and IGA; the compiled measurements are shown in FIG. 13 and FIG. 14. The relative uncertainty in the measurement was 3%.

The particles of this reference powder were essentially spherical. Their diameter was in the range 10 µm to 100 µm with an average diameter of 30 µm. Its median diameters $D_{10}$, $D_{50}$ and $D_{90}$, measured by laser granulometry in accordance with the standard ISO 13320 (2009-12-01 edition), were as follows: $D_{10}$=21 µm, $D_{50}$=28 µm, and $D_{90}$=39 µm.

The apparent density, measured by the standard ASTM B-212, was 4.39 g/cm$^3$±0.01 g/cm$^3$. The true density, measured by helium pycnometry, was 7.99 g/cm$^3$±0.03 g/cm$^3$.

The Hall flow rate (capacity to make 50 g of powder flow through an orifice of fixed dimensions), measured in accordance with the standard ASTM B213, was 16 seconds. A steel powder used in the manufacturing process of the invention has, for example, a Hall flow rate in the range 30 seconds to 500 seconds.

Figures 17, 18:
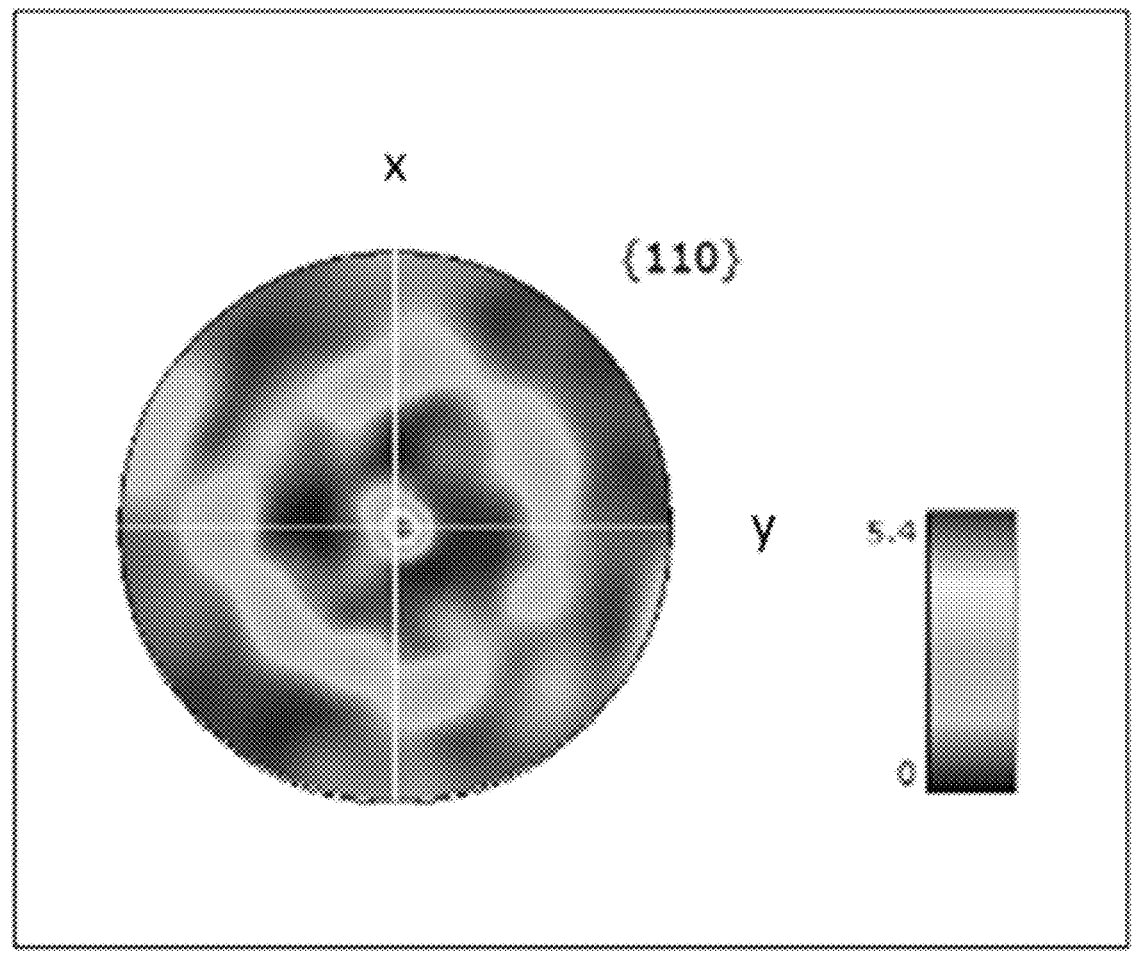
FIG. 17 represents a table indicating the content by weight of the chemical elements composing a reference steel material.
FIG. 18 represents a pole figure for a reference steel material obtained from data collected by EBSD.

The reference solid material obtained had a chemical composition as indicated in FIG. 17 as a percentage by weight in the matrix and in two different metallic oxide precipitates.

Regarding its microstructure, the reference solid material had a cellular structure.

Figure 15:
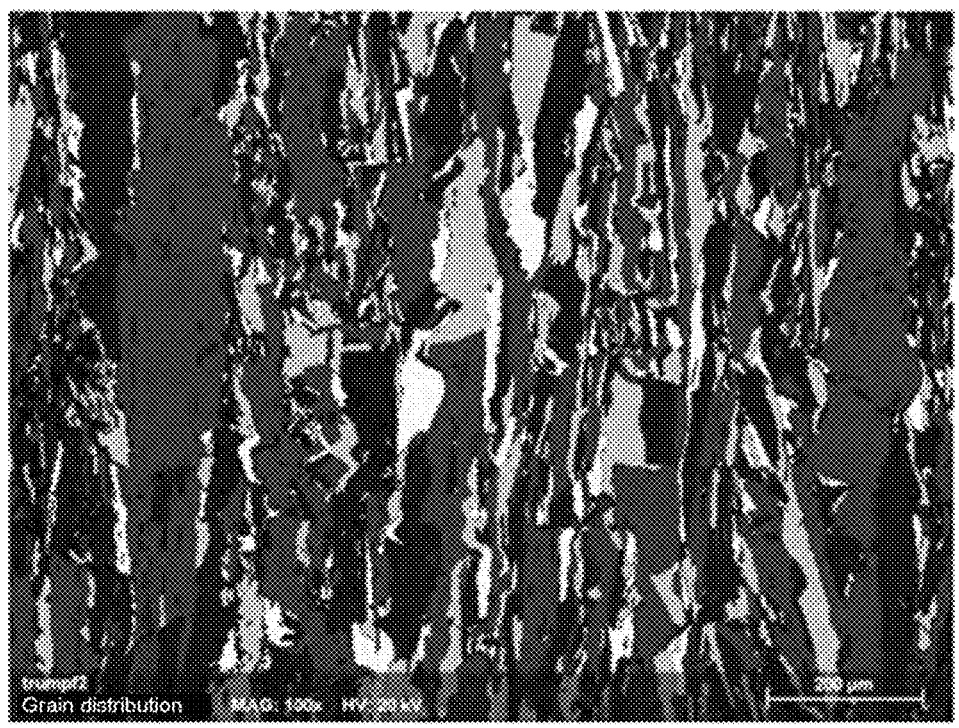
FIG. 15 and
FIGS. 15 and 16 represent images obtained by Electron Backscattered Diffraction of a reference steel material respectively in a plane parallel to and in a plane perpendicular to the direction z of additive manufacture of the material.
Figure 16:
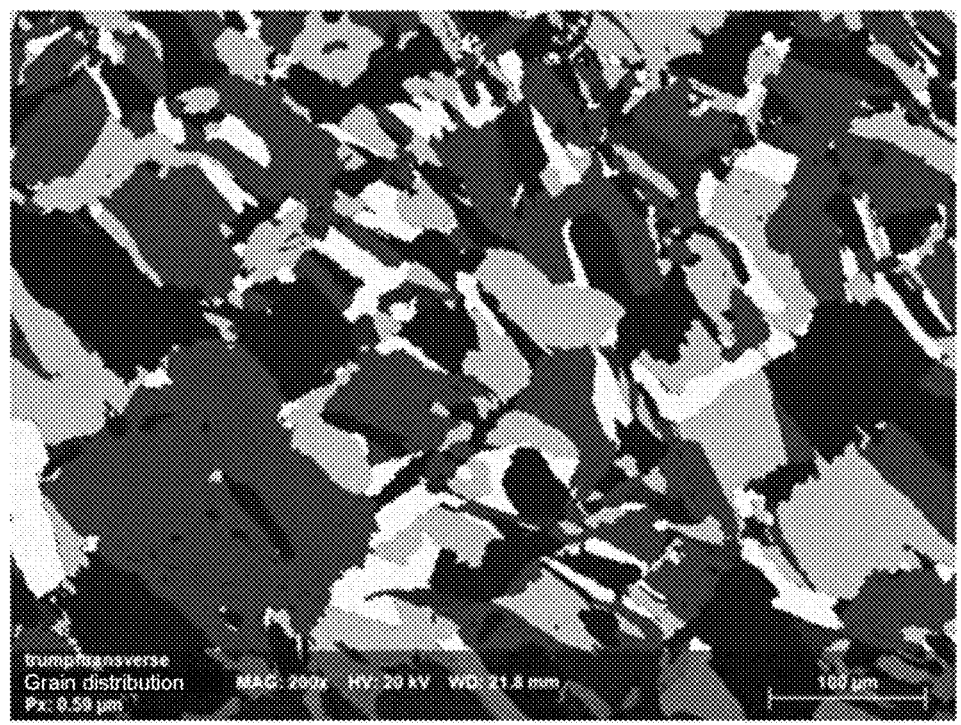

The grains constituting these cells comprised a matrix into which the precipitates had been incorporated. The corresponding structure is represented on the images of FIGS. 15 and 16, which show that the axial growth of the reference steel material produced a columnar and therefore anisotropic structure for the grains in a plane parallel to the direction z of additive manufacture of the material. These grains had an average width (Dmin) of 20.8 µm±2.7 µm and an average length (Dmax) of 68.6 µm±8.3 µm, i.e. an average ratio Dmax/Dmin of 3.2±0.1.

This microstructural characteristic is illustrated by FIG. 18, which shows that the reference steel material has a texture in the plane (110) parallel to the build direction Z resulting in a strong texture intensity equal to 5.4.

In order to compare the properties linked to the microstructure of the reference steel material with respect to the steel material of the invention, various treatments were applied:

the reference steel material underwent a hot isostatic pressing treatment (denoted "HIP") identical to that of Example 4;

the reference steel material and the steel material of the invention underwent a heat treatment (denoted "TT") consisting of a treatment in which each unrefined build material was maintained at a temperature of 700° C. for 1 hour (known as "stress relieving" treatment).

At the end of these treatments, the average grain size was measured by the intercept method for the reference steel material and the steel material of the invention as obtained at the end of:

i) the additive manufacturing process (unrefined build), or
ii) the additive manufacturing process followed by the stress relieving heat treatment ("TT"), or
iii) the additive manufacturing process followed by the hot isostatic pressing treatment ("HIP").

This average size was measured for the largest dimension "Dmax" (length) or the smallest dimension "Dmin" (width) of the grains constituting each material. The corresponding ratio Dmax/Dmin was calculated in order to evaluate the equiaxial nature of the grains of each material.

Figure 19:
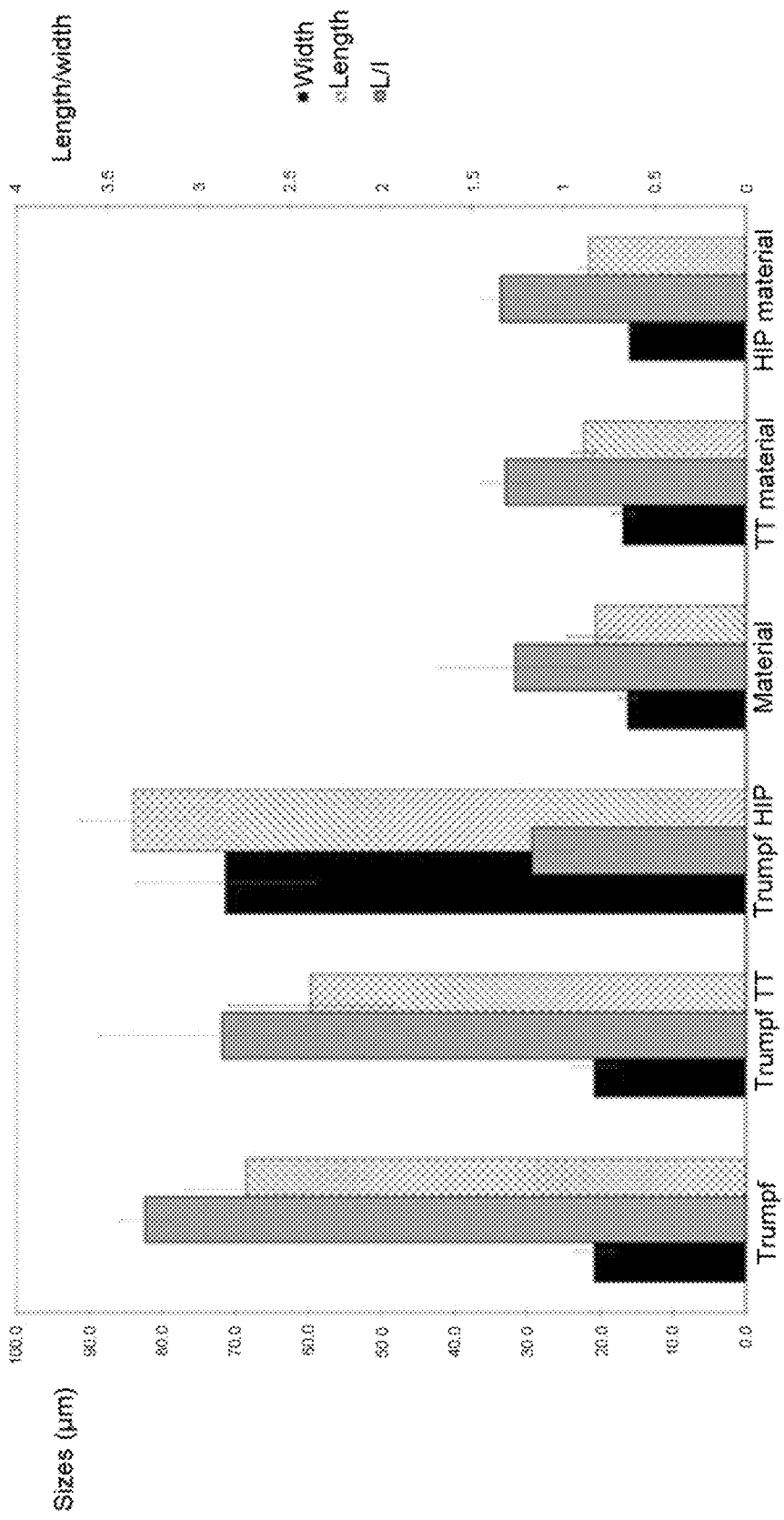
FIG. 19 represents un graph indicating, for a reference steel material and for a steel material of the invention (unrefined materials and materials after treatment (s)): on the one hand, up the left hand side ordinate is the average size of the grains, expressed in µm for the largest dimension and the smallest dimension of the grains, and on the other hand, up the right hand side ordinate is the ratio between these two dimensions.

The results are presented in FIG. 19, which shows that the reference steel material (denoted "Trumpf") underwent modifications in the geometry of its grains after the heat treatment, but especially after hot isostatic pressing. The distribution of the misorientation angles was thus modified for the reference steel material.

In contrast, the microstructure of the steel material of the invention (denoted "Material") was extremely stable, because no substantial modifications to the geometry of the grains were observed (in particular, the grain size remained small, namely, for example, less than or equal to 50 μm for L and l), which provides the steel material of the invention with great robustness and mechanical and thermal stability.

The mechanical properties of the "Praxair" steel material of the invention (new measures taken) and of the "Trumpf" reference steel material were measured before and after having undergone the treatment of the invention comprising a step for hot isostatic pressing (HIP). The resulting table of FIG. 20 summarises the values obtained for the parameters Rm (maximum tensile strength, expressed in MPa), Rp0.2 (yield strength, expressed in MPa), A (elongation at break, as a %), both in a direction parallel (//Z) to and perpendicular ($\perp$Z)) to the direction z of additive manufacture of the two materials. At the same time, the percentage anisotropy for each of these parameters is indicated: the smaller this percentage is, the more isotropic are the mechanical properties, namely that their value is homogeneous irrespective of the direction of measurement.

The analysis of FIG. 19 and FIG. 20 shows that:
before the HIP treatment, the mechanical anisotropy (Rm, R p0.2 and A) was lower for the steel material of the invention (Praxair) than for the reference steel material.
After the HIP treatment, the mechanical anisotropy was greatly reduced for the two materials (Praxair and Trumpf). However, only the steel material of the invention did not suffer an increase in the average size of these grains by the phenomenon of grain coalescence. This size remained stable and below 30 μm despite the HIP treatment.

In conclusion, the steel material of the invention obtained after the HIP treatment of the invention has equiaxial grains, isotropic mechanical properties, a fine microstructure (the average grain size is generally 50 μm or less, for example an average size "Dmax" and/or "Dmin" in the range 10 μm to 50 μm, or even in the range 10 μm to 30 μm) and precipitates which are generally nanometric in size (generally in the range 10 nm to 100 nm).

Clearly, the present invention is not in any way limited to the embodiments described and shown, and the person skilled in the art will be able to combine them and use their general knowledge to make many variations and modifications.

The invention claimed is:
1. A process for manufacturing a steel material, the process comprising:
consolidating a steel powder, thereby forming the steel material; or
coating a support with the steel powder, thereby producing the support coated with a coating comprising the steel material,
wherein the steel powder comprises particles comprising a matrix and precipitates incorporated into the matrix, the precipitates being distributed in the matrix with an average density in a range of from 2 to 100 precipitates/μm$^3$,
wherein (i) the matrix of the steel powder has a 316L steel composition according to ASTM A666 standard and comprises, as a weight percentage:
16.0 to 18.0% of chromium;
10.0 to 14.0% of nickel;
0.001 to 0.030% of carbon;
0.001 to 0.050% of oxygen;
0 to 2.0% of manganese;
2.0 to 3.0% of molybdenum;
0 to 0.75% of silicon;
0.10% or less of nitrogen;
0.045% or less of phosphorus;
0.030% or less of sulfur;
0 to 0.0300% of aluminum;
0 to 0.003% of vanadium; and
iron,
wherein (ii) the precipitates comprise a metallic element M, a metallic element M', and/or a metallic element M",
wherein each of the metallic elements M, M', and M", if present, is selected from the group consisting of yttrium, titanium, iron, chromium, tungsten, silicon, zirconium, thorium, magnesium, manganese, aluminum, hafnium, molybdenum, and a mixture thereof, and
wherein the matrix of the steel material microstructure consists of equiaxed grains having an average grain size in a range of from 10 μm to 50 μm at a largest dimension Dmax and a smallest dimension Dmin, and
wherein the equiaxed grains have a Dmax/Dmin ratio of the largest dimension Dmax to the smallest dimension Dmin of a grain in a range of from 1 to 2.

2. The process of claim 1, wherein the precipitates of the steel powder comprise a metallic oxide, a metallic carbide, an oxymetallic carbide, and/or an intermetallic compound, each of which comprising at least one metallic element of the metallic elements M, M', and M".

3. The process of claim 2, wherein the precipitates of the steel powder comprise a metallic carbide selected from the group consisting of
a simple carbide $MC_{8-x}$, wherein x is greater than or equal to 0 but less than 8,
a mixed carbide $MM'_{y'}C_{8-x'}$, wherein x' is greater than or equal to 0 but less than 8 and y' is in a range of from 0 to 5, and
a mixture thereof.

4. The process of claim 3, wherein the metallic carbide comprises a simple carbide $MC_{8-x}$ selected from the group consisting of TiC, SiC, $AlC_3$, CrC, and a mixture thereof.

5. The process of claim 3, wherein the metallic carbide comprises a mixed carbide $MM'_{y'}C_{8-x'}$ selected from the group consisting of (FeCr), $(FeCr)_{23}C_6$, and a mixture thereof.

6. The process of claim 2, wherein the precipitates of the steel powder comprise an oxymetallic carbide comprising:
a metallic oxide selected from the group consisting of (i) a simple oxide $MO_{2-x}$, wherein x is in a range of from 0 to 1, (ii) a mixed oxide $MM'_{y'}O_{5-x'}$, wherein x' is greater than or equal to 0 but less than 5, and y' is greater than 0 but less than or equal to 2, (iii) a mixed oxide MM'$_{y'}$M"$_{y''}$O$_{5-x''}$, wherein x" is greater than or equal to 0 but less than 5, y' is greater than 0 but less than or equal to 2, and y" is greater than 0 but less than or equal to 2, and (iv) a mixture thereof; and a metallic carbide selected from the group consisting of (i) a simple carbide MC$_{8-x}$, wherein x is greater than or equal to 0 but less than 8, (ii) a mixed carbide MM'$_{y'}$C$_{8-x'}$, wherein x' is greater than or equal to 0 but less than 8, and y' is in a range of from 0 to 5, and (iii) a mixture thereof.

7. The process of claim 2, wherein the precipitates of the steel powder comprise an intermetallic compound selected from the group consisting of YFe$_3$, Fe$_2$Ti, FeCrWTi, and a mixture thereof.

8. The process of claim 2, wherein the precipitates of the steel powder comprise a metallic carbide, and
wherein the precipitates have an average size in a range of from 10 nm to 50 nm.

9. The process of claim 2, wherein the precipitates of the steel powder comprise a metallic oxide and/or an oxymetallic carbide, and
wherein the precipitates have an average size in a range of from 10 nm to 100 nm.

10. The process of claim 1, wherein the precipitates of the steel powder comprise a metallic oxide selected from the group consisting of
a simple oxide MO$_{2-x}$, wherein x is in a range of from 0 to 1,
a mixed oxide MM'$_{y}$O$_{5-x'}$, wherein x' is greater than or equal to 0 but less than 5, and y' is greater than 0 but less than or equal to 2,
a mixed oxide MM'$_{y'}$M"$_{y''}$O$_{5-x''}$, wherein x" is greater than or equal to 0 but less than 5, y' is greater than 0 but less than or equal to 2, and y" is greater than 0 but less than or equal to 2, and
a mixture thereof.

11. The process of claim 10, wherein the metallic oxide comprises a simple oxide MO$_{2-x}$ selected from the group consisting of Y$_2$O$_3$, Fe$_2$O$_3$, FeO, Fe$_3$O$_4$, Cr$_2$O$_3$, TiO$_2$, Al$_2$O$_3$, HfO$_2$, SiO$_2$, ZrO$_2$, ThO$_2$, MgO, MnO, MnO$_2$, and a mixture thereof.

12. The process of claim 11, wherein the simple oxide MO$_{2-x}$ is TiO$_2$.

13. The process of claim 10, wherein the metallic oxide comprises a mixed oxide MM'$_{y}$O$_{5-x'}$ selected from the group consisting of FeTiO$_3$, Y$_2$Ti$_2$O$_7$, YTi$_2$O$_5$, and a mixture thereof.

14. The process of claim 1, wherein the precipitates of the steel powder have an average size in a range of from 5 nm to 200 nm.

15. The process according to claim 1, wherein the precipitates are distributed in the matrix with an average density in a range of from 2 precipitates/μm$^3$ to 6 precipitates/μm$^3$.

16. The process of claim 1, wherein the matrix of the steel powder comprises, as a proportion by weight with respect to a weight of the steel powder,
0 ppm to 500 ppm of the metallic element M,
0 ppm to 500 ppm of the metallic element M', and/or
0 ppm to 500 ppm of the metallic element M".

17. The process of claim 1, wherein the metallic element M, M', or M" is yttrium, titanium, tungsten, zirconium, thorium, aluminum, hafnium, silicon, manganese, or molybdenum.

18. The process of claim 1, wherein the steel powder comprises the precipitates in a range of from 0.1% to 1.5% by weight.

19. The process of claim 1, wherein the steel powder is austenitic in structure.

20. The process of claim 1, wherein the particles of the steel powder have a median diameter (d$_{50}$) in a range of from 10 μm to 200 μm.

21. The process of claim 1, wherein an apparent density of the steel powder, measured by the standard ASTM B-212, is in a range of from 3.5 g/cm$^3$ to 4.5 g/cm$^3$.

22. The process of claim 1, wherein a true density of the steel powder is in a range of from 7.95 g/cm$^3$ to 8.05 g/cm$^3$.

23. The process of claim 1, wherein the consolidating is performed by an additive manufacturing process.

24. The process of claim 23, wherein the additive manufacturing process is a selective laser melting process, a selective electron beam melting process, a selective laser sintering process, a laser spraying process, or a binder spraying process.

25. The process of claim 1, wherein grains of the steel material are equiaxed in a plane which is parallel to a plane of superimposed layers of a material manufactured by an additive manufacturing process.

26. The process of claim 1, wherein grains of the steel material are equiaxed in a plane which is perpendicular to a plane of superimposed layers of a material manufactured by an additive manufacturing process.

27. The process of claim 1, wherein the equiaxed grains have a ratio Dmax/Dmin of the largest dimension Dmax to the smallest dimension Dmin of a grain in a range of from 1 to 1.5.

28. The process of claim 1, wherein the precipitates in the matrix are not modified in size during the process from the steel powder to the steel material.

29. The process of claim 28, wherein a chemical composition of the precipitates and the matrix are not modified in the process from the steel powder to the steel material.

30. The process of claim 1, wherein the average density of the precipitates in the matrix is not modified in the process from the steel powder to the steel material.

* * * * *